US012422266B2

(12) United States Patent
Mai et al.

(10) Patent No.: US 12,422,266 B2
(45) Date of Patent: Sep. 23, 2025

(54) AUGMENTED REALITY WAYFINDING

(71) Applicant: Waymo LLC, Mountain View, CA (US)

(72) Inventors: Bruce Mai, Sacramento, CA (US); Maria Moon, Mountain View, CA (US); Jonathan Willing, Mountain View, CA (US); Peter Crandall, San Jose, CA (US); Steven Kleiser, Mountain View, CA (US); Kevin Malta, San Francisco, CA (US)

(73) Assignee: WAYMO LLC, Mountain View, CA (US)

( * ) Notice: Subject to any disclaimer, the term of this patent is extended or adjusted under 35 U.S.C. 154(b) by 128 days.

(21) Appl. No.: 17/578,896

(22) Filed: Jan. 19, 2022

(65) Prior Publication Data

US 2025/0244136 A1    Jul. 31, 2025

(51) Int. Cl.
*G01C 21/36* (2006.01)
*G01C 21/34* (2006.01)
*G06T 19/00* (2011.01)

(52) U.S. Cl.
CPC ..... *G01C 21/3635* (2013.01); *G01C 21/3438* (2013.01); *G01C 21/3676* (2013.01); *G06T 19/006* (2013.01)

(58) Field of Classification Search
CPC ........... G01C 21/3635; G01C 21/3438; G01C 21/3676; G06T 19/006
See application file for complete search history.

(56) References Cited

U.S. PATENT DOCUMENTS 8,422,693 B1  4/2013  Daily et al.
8,676,427 B1  3/2014  Ferguson et al.
(Continued)

FOREIGN PATENT DOCUMENTS

EP    3213177 B1    2/2021
WO   2020190254 A1   9/2020
WO   2020222325 A1  11/2020

OTHER PUBLICATIONS

Bradley, Nicholas A., et al., "An Experimental Investigation into Wayfinding Directions for Visually Impaired People", Personal and Ubiquitous Computing ISSN 1617-4909, University of Strathclyde, 2005, pp. 395-403.

(Continued)

*Primary Examiner* — Navid Z. Mehdizadeh
*Assistant Examiner* — Oliver Tan
(74) *Attorney, Agent, or Firm* — Botos Churchill IP Law LLP

(57) ABSTRACT

The technology uses augmented reality (AR) elements for enhanced wayfinding with autonomous vehicle pickups and drop-offs. The approach includes generating, for presentation in a first region of a client device UI, trip information regarding a trip. Map information associated with the trip is generated for presentation in a second UI region, including at least one of a pickup location for a rider, a walking path from a current location of the rider to the pickup location, a planned route of the vehicle to the pickup location, or a current location of the vehicle. An AR indicator is generated for presentation in the second UI region. Upon selection of the indicator, the system modifies the second region into a first section to display at least a portion of the map information and a second section to display an augmented reality view, or replace the map information with the AR view.

22 Claims, 31 Drawing Sheets
(14 of 31 Drawing Sheet(s) Filed in Color)

(56) References Cited

U.S. PATENT DOCUMENTS

| | | | |
|---|---|---|---|
| 9,613,386 | B1* | 4/2017 | Arden .................. G08G 1/205 |
| 9,928,734 | B2 | 3/2018 | Newman |
| 10,126,136 | B2 | 11/2018 | Iagnemma |
| 10,319,128 | B2 | 6/2019 | Billi-Duran et al. |
| 10,388,075 | B2 | 8/2019 | Schmirler et al. |
| 10,423,834 | B2 | 9/2019 | Badalamenti et al. |
| 10,508,925 | B2 | 12/2019 | Badalamenti et al. |
| 10,580,291 | B1 | 3/2020 | Rothenberg et al. |
| 10,696,222 | B1 | 6/2020 | Pandit et al. |
| 10,714,116 | B2 | 7/2020 | Tintor et al. |
| 10,977,272 | B2 | 4/2021 | Nadler |
| 11,030,818 | B1 | 6/2021 | Wang et al. |
| 11,041,733 | B2 | 6/2021 | Kline et al. |
| 11,118,930 | B2* | 9/2021 | Eyler ................ G01C 21/3638 |
| 11,120,264 | B2* | 9/2021 | O'Connell ........... G08G 1/0175 |
| 11,195,409 | B1 | 12/2021 | Rothenberg et al. |
| 2014/0028477 | A1 | 1/2014 | Michalske |
| 2014/0171039 | A1 | 6/2014 | Bjontegard |
| 2015/0199020 | A1 | 7/2015 | Hatada et al. |
| 2017/0109916 | A1 | 4/2017 | Kurz et al. |
| 2017/0153714 | A1 | 6/2017 | Gao et al. |
| 2017/0277191 | A1 | 9/2017 | Fairfield et al. |
| 2017/0316696 | A1 | 11/2017 | Bartel |
| 2017/0343375 | A1* | 11/2017 | Kamhi .................. G06T 11/60 |
| 2017/0344010 | A1 | 11/2017 | Rander et al. |
| 2018/0196415 | A1 | 7/2018 | Iagnemma et al. |
| 2018/0299895 | A1 | 10/2018 | Knotts et al. |
| 2019/0017839 | A1* | 1/2019 | Eyler .................... G02B 27/01 |
| 2020/0191593 | A1* | 6/2020 | Herman ................ G06V 20/70 |
| 2021/0097866 | A1* | 4/2021 | Leary .................. G05D 1/0248 |
| 2021/0337298 | A1 | 10/2021 | Maguire et al. |
| 2021/0374407 | A1 | 12/2021 | O'Connell et al. |
| 2023/0020119 | A1 | 1/2023 | Leary et al. |

OTHER PUBLICATIONS

Dunai, Larisa, et al., "Real-Time Assistance Prototype—a new Navigation Aid for blind people", ResearchGate, 2010 IEEE, pp. 1173-1178.

Flores, G., et al., "Vibrotactile Guidance for Wayfinding of Blind Walkers", Published by the IEEE Computer Society, 2015, pp. 1-13.

Lee, Sooyeon, et al., "Conversations for Vision: Remote Sighted Assistants Helping People with Visual Impairments", arXiv:1812.00148v1 [cs.HC] Dec. 1, 2018, pp. 1-19.

Marston, James R., et al., "Nonvisual Route Following with Guidance from a Simple Haptic or Auditory Display", Journal of Visual Impairment & Blindness, AFB, 2007, pp. 203-211.

Myers, Misha, "Walk with me, talk with me: the art of conversive wayfinding", Visual Studies, vol. 25, No. 1, 2010, pp. 1-12.

Noceti, Nicoletta, et al., "Designing audio-visual tools to support multisensory disabilities", Chapter 4, 2019, pp. 79-102.

Ochsner, Beate, et al., "Rethinking Assistive Technologies: Users, Environments, Digital Media, and App-Practices of Hearing", Nanoethics, https://doi.org/10.1007/s11569-020-00381-5, 2020, pp. 1-15.

Paneels, Sabrina A., et al., "The Walking Straight Mobile Application: Helping the Visually Impaired Avoid Veering", ICAD 2013, pp. 1-32.

Prasad, Manoj, et al., "HaptiMoto: Turn-by-Turn Haptic Route Guidance Interface for Motorcyclists", ResearchGate, Session: Location-Based Services and Navigation, CHI 2014, One of a CHInd, Toronto, ON, Canada, pp. 3597-3606.

Wenqiang, Jin, et al., "Acoussist: An Acoustic Assisting Tool for People with Visual Impairments to Cross Uncontrolled Streets", Proc. ACM Interact. Mob. Wearable Ubiquitous Technol., vol. 4, No. 4, Article 133. Publication date: Dec. 2020, pp. 1-30.

Jacobs, J., et al., "Potential Augmented Reality Applications in the Mining Industry", ResearchGate, 2016, pp. 1-15.

Singh, Mona, et al., "Augmented Reality Interfaces", Computer Science, IEEE Internet Computing, https://www.semanticscholar.org/paper/Augmented-Reality-Interfaces-Singh-Singh/c2bc18f1a8b18819daedb780975f708b36718557, 2013, pp. 1-8.

Wen, Ming-Chang, et al., "Augmented Reality and Unmanned Aerial Vehicle Assist in Construction Management", Computing in Civil and Building Engineering, ASCE, 2014, pp. 1570-1577.

European Search Report for Application No. EP23151299 dated Jun. 22, 2023.

The Extended European Search Report for European Patent Application No. 23165209.0, Oct. 17, 2023, 13 Pages.

* cited by examiner

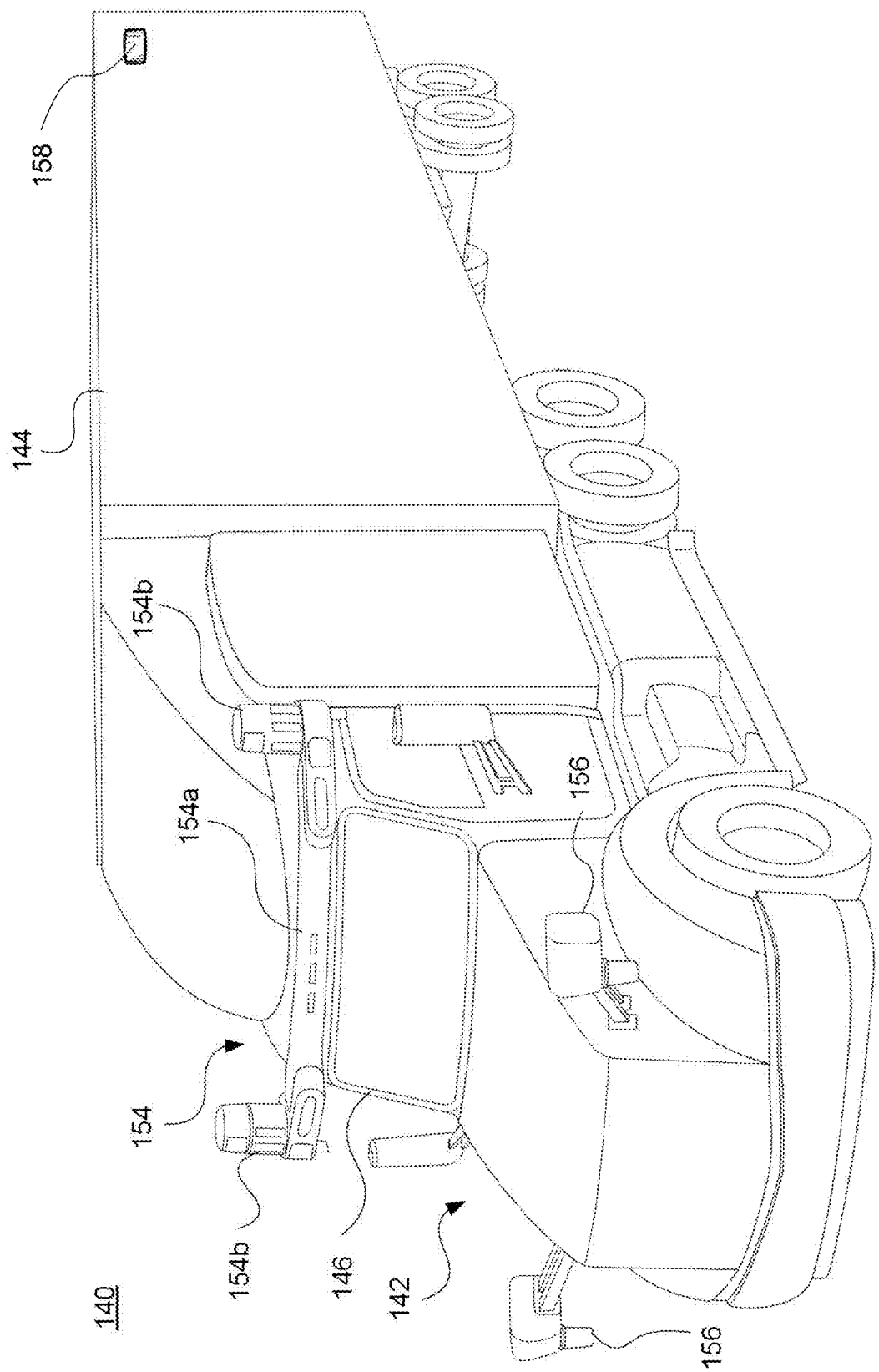

160

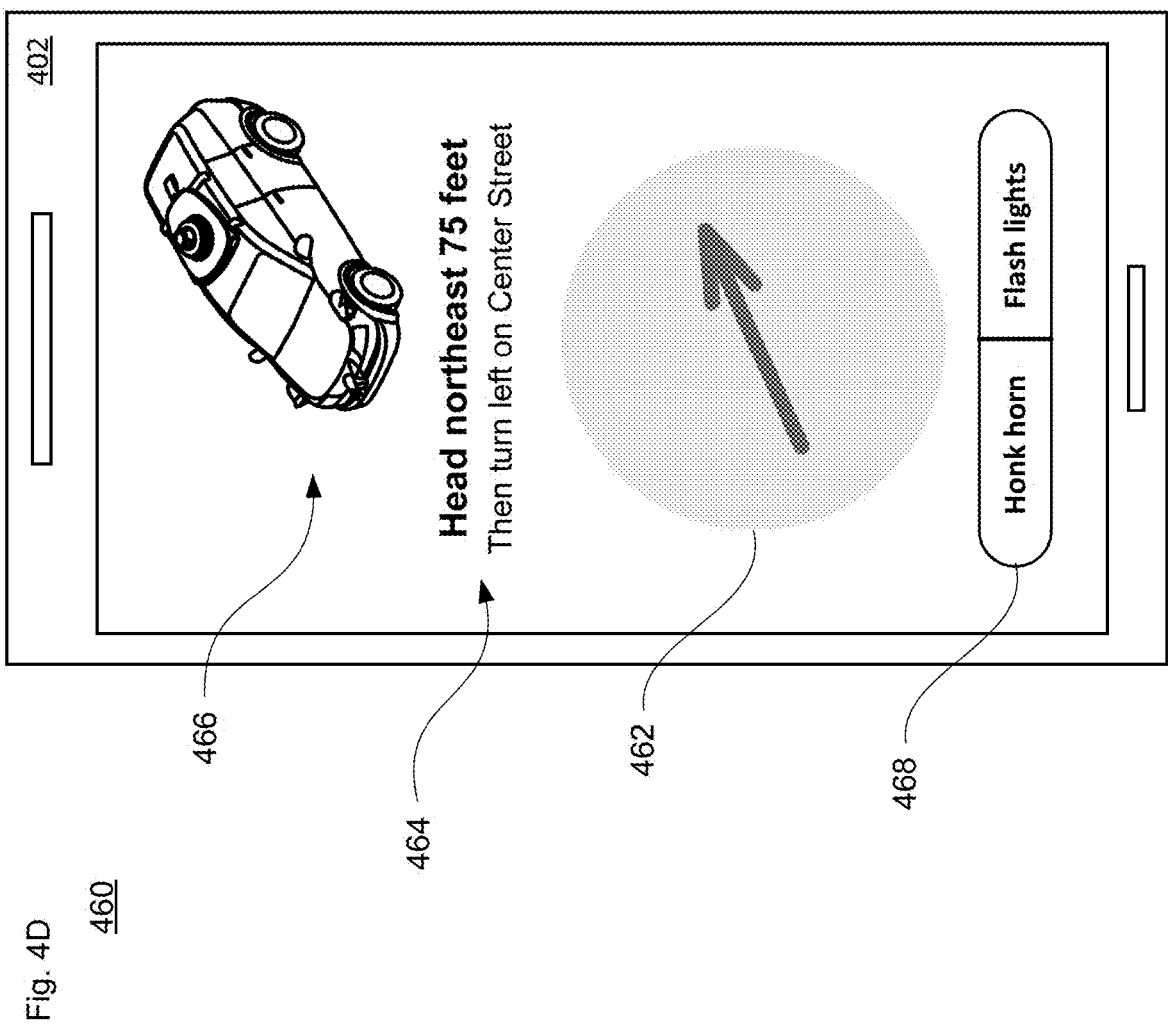

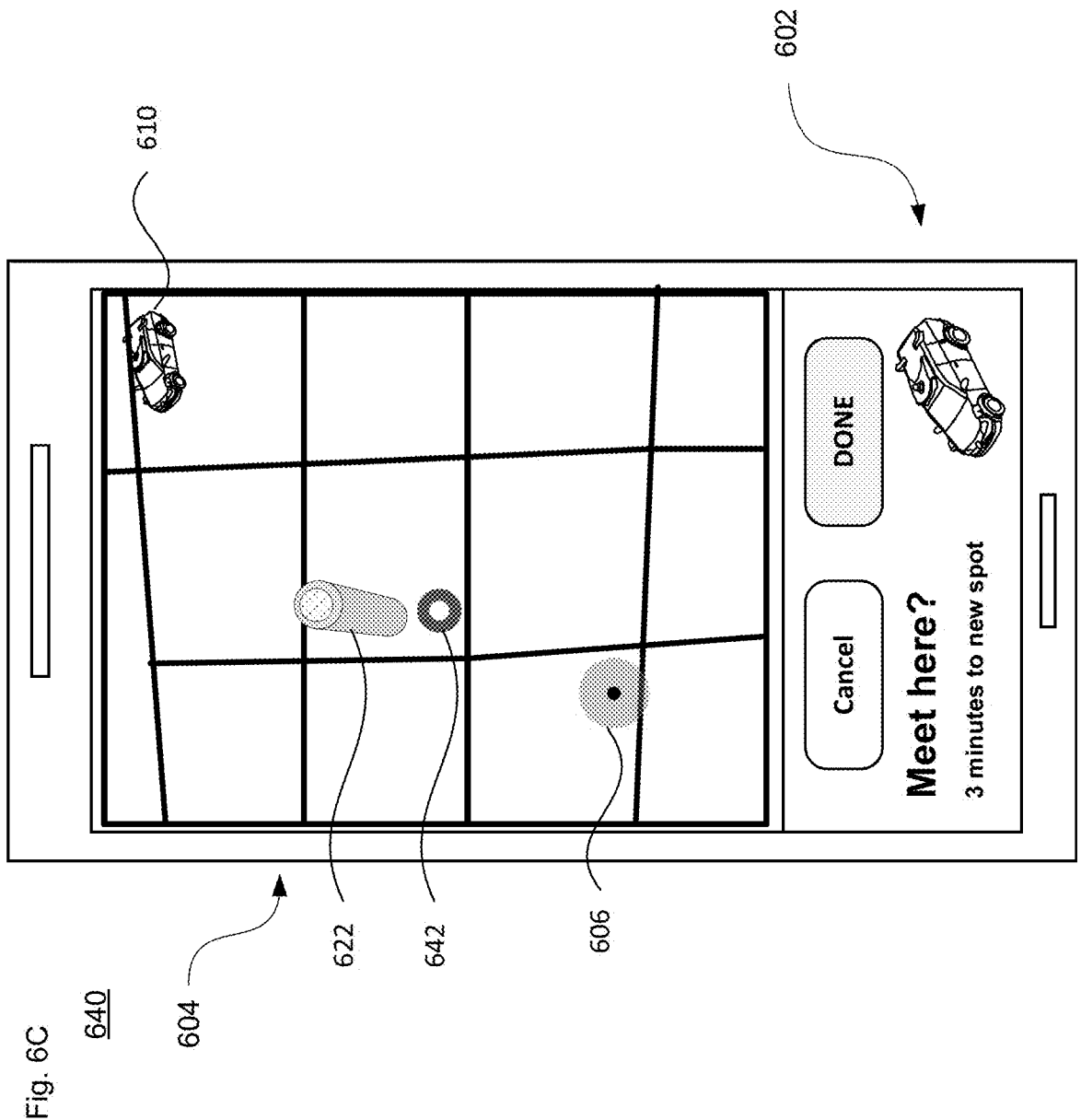

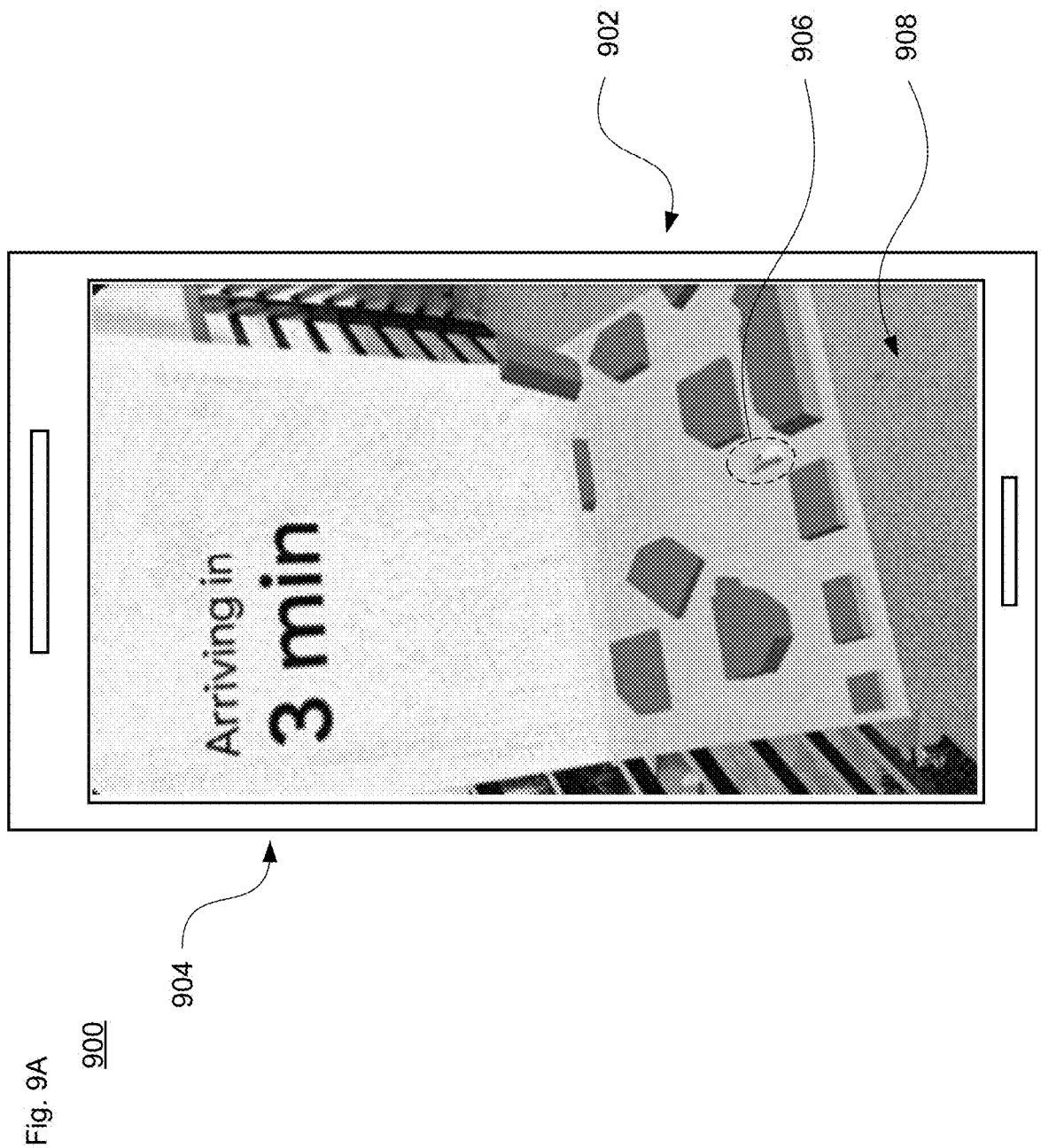

1160

1200

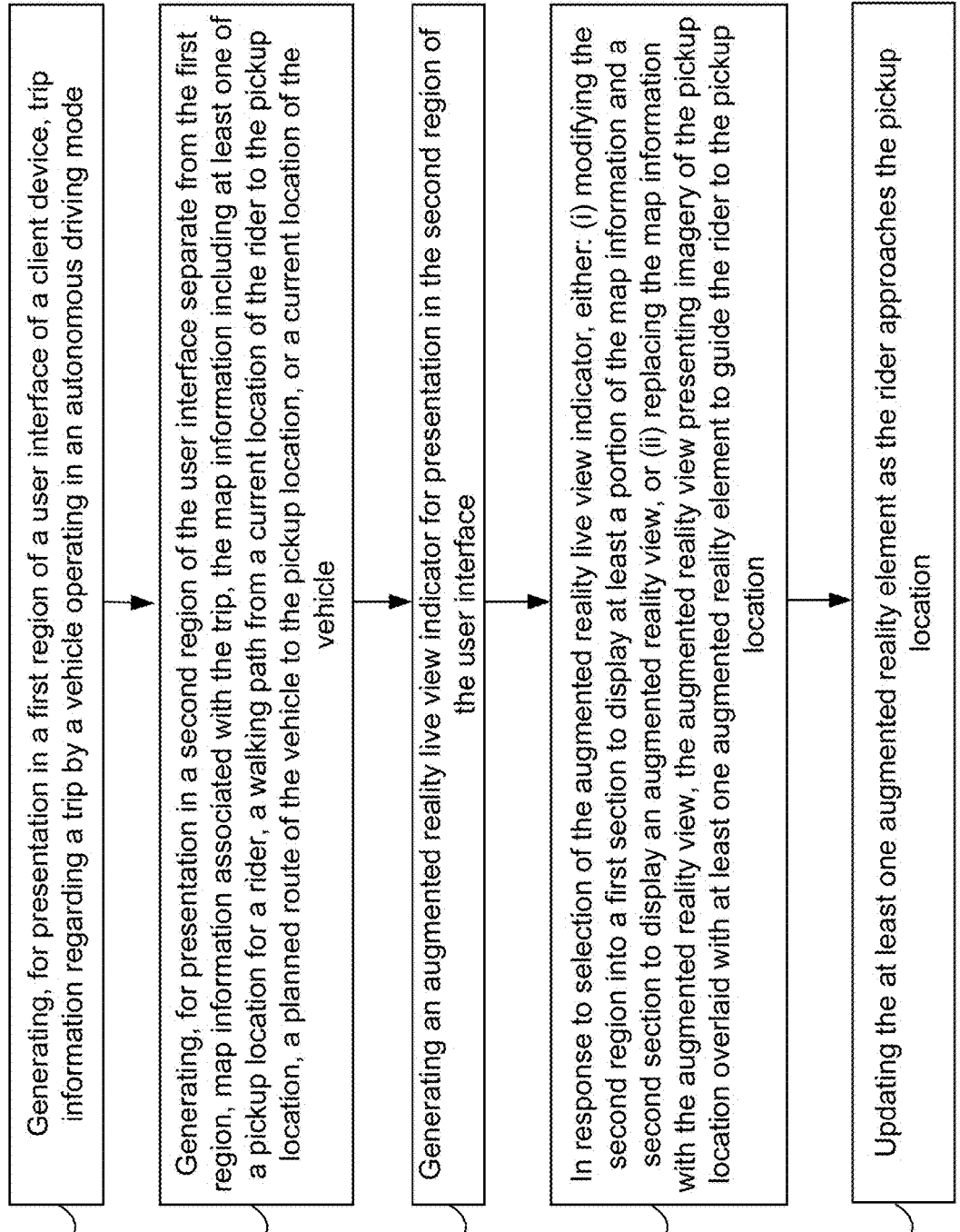

Fig. 13
1300

1302 — Generating, for presentation in a first region of a user interface of a client device, trip information regarding a trip by a vehicle operating in an autonomous driving mode 1304 — Generating, for presentation in a second region of the user interface separate from the first region, map information associated with the trip, the map information including at least one of a pickup location for a rider, a walking path from a current location of the rider to the pickup location, a planned route of the vehicle to the pickup location, or a current location of the vehicle 1306 — Generating an augmented reality live view indicator for presentation in the second region of the user interface 1308 — In response to selection of the augmented reality live view indicator, either: (i) modifying the second region into a first section to display at least a portion of the map information and a second section to display an augmented reality view, or (ii) replacing the map information with the augmented reality view, the augmented reality view presenting imagery of the pickup location overlaid with at least one augmented reality element to guide the rider to the pickup location 1310 — Updating the at least one augmented reality element as the rider approaches the pickup location

AUGMENTED REALITY WAYFINDING

BACKGROUND

Autonomous vehicles, for instance, vehicles that may not require a human driver in certain driving situations, can be used to aid in the transport of passengers or items from one location to another. Such vehicles may operate in a fully autonomous mode where passengers may provide some initial input, such as a pickup or destination location, and the vehicle maneuvers itself to that location. However, for a variety of reasons it may be challenging to guide a rider or other user to a specific location to meet a vehicle, or to identify which vehicle to go to. In addition, when there is no human driver, riders in the vehicle may miss certain information about their trip. These different types of situations could adversely impact the rider or other user's experience, delay pickup or drop-off, affect deliveries or cause other issues.

BRIEF SUMMARY

The technology relates to using augmented reality (AR) elements to enhance wayfinding for pickups and drop-offs, as well as to improve the in-vehicle experience for riders. This is applicable in general use cases for any customer interacting with a vehicle operating in an autonomous driving mode, as well as situations in which the rider has visual or hearing impairments, or even safety concerns. Aspects involve AR and vehicle interaction as well as AR that is implemented as part of a user app on a client device, such as a mobile phone, wearable computing device, tablet computer, etc. The aspects can include easily understood visual cues, turn-by-turn directions, an interactive rider support video chat, and combining an AR view with a live view of the rider or the vehicle's surrounding environment (with or without maps).

According to one aspect, a method is provided that comprises: generating, by one or more processors for presentation in a first region of a user interface of a client device, trip information regarding a trip by a vehicle operating in an autonomous driving mode; generating, by the one or more processors for presentation in a second region of the user interface separate from the first region, map information associated with the trip, the map information including at least one of a pickup location for a rider, a walking path from a current location of the rider to the pickup location, a planned route of the vehicle to the pickup location, or a current location of the vehicle; generating, by the one or more processors, an augmented reality live view indicator for presentation in the second region of the user interface; in response to selection of the augmented reality live view indicator, the one or more processors either: (i) modifying the second region into a first section to display at least a portion of the map information and a second section to display an augmented reality view, or (ii) replacing the map information with the augmented reality view, the augmented reality view presenting imagery of the pickup location overlaid with at least one augmented reality element to guide the rider to the pickup location; and updating, by the one or more processors, the at least one augmented reality element as the rider approaches the pickup location.

Replacing the map information with the augmented reality view may include minimizing the map information within the second region. The trip information may include an indicia about the vehicle.

The augmented reality view may provide at least one vehicle control option for selection by the rider. Here, upon selection of a given one of the at least one vehicle control option, the method includes sending a signal to the vehicle to cause the vehicle to perform an action. In one example, the action is to generate a visual or audible signal to the rider. In another example, the action is to either unlock a door of the vehicle or to roll down a window of the vehicle.

The augmented reality view may include an augmented reality representation of the vehicle at the pickup location. In this case, the method may further comprise determining, by the one or more processors, at least one of an appropriate size, orientation or placement of the augmented reality representation of the vehicle; and arranging for display, based on the determining, the augmented reality representation of the vehicle at the pickup location. Determining the orientation or placement may include selecting an alignment of the augmented reality representation relative to a curb of a roadway in the imagery of the pickup location. Alternatively or additionally, the method may further comprise adjusting the augmented reality representation of the vehicle when the rider's location changes or the pickup location changes.

The at least one augmented reality element may include a first augmented reality element representing the vehicle and a second augmented reality element that is a marker to identify either a pickup spot or a landmark. Here, the method includes updating the at least one augmented reality element includes updating the first augmented reality element but not the second augmented reality element.

Alternatively or additionally to any of the above examples, the imagery may be live imagery obtained in real time from the client device. In this case, the method may further comprise sending the live imagery from the client device to the vehicle to support adjusting the pickup location. The imagery may be obtained from a perception system of the vehicle.

Alternatively or additionally to any of the above examples, the method may further comprise customizing the at least one augmented reality element in response to a rider selection or user preference.

Alternatively or additionally to any of the above examples, the at least one augmented reality element may include an icon representing the pickup location. In this case, the method further comprises requesting a change to the pickup location in response to receiving rider input modifying a position of the icon.

Alternatively or additionally to any of the above examples, the method may further comprise generating information for presentation to the rider regarding a sensor of the vehicle, in which the information includes at least one of a description of the sensor or what the sensor is configured to detect. Alternatively or additionally to any of the above examples, the method may further comprise, upon rider arrival at the pickup location, generating boarding instructions to the rider for entering the vehicle. Alternatively or additionally to any of the above examples, the method may further comprise, upon rider arrival at the pickup location, generating indicia to show the rider the location of a package being delivered by the vehicle.

Alternatively or additionally to any of the above examples, upon the rider boarding the vehicle, the method may further include generating an augmented reality object for presentation in the user interface of the client device, in which the augmented reality object provides contextual information about the trip. Alternatively or additionally to any of the above examples, upon the rider boarding the vehicle, the method may further include causing information displayed in the user interface of the client device to be sent to the vehicle for presentation on one or more display devices of the vehicle during the trip.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1C-E illustrate example cargo and delivery type vehicles configured for use with aspects of the technology.

FIGS. 4A-D illustrate examples of an augmented reality live view in accordance with aspects of the technology.

FIGS. 6A-C illustrate an example for adjusting a pickup location in accordance with aspects of the technology.

FIGS. 9A-B illustrate examples of virtual information stands in accordance with aspects of the technology.

FIG. 13 illustrates an example method in accordance with aspects of the technology.

DETAILED DESCRIPTION

Figure 1A:
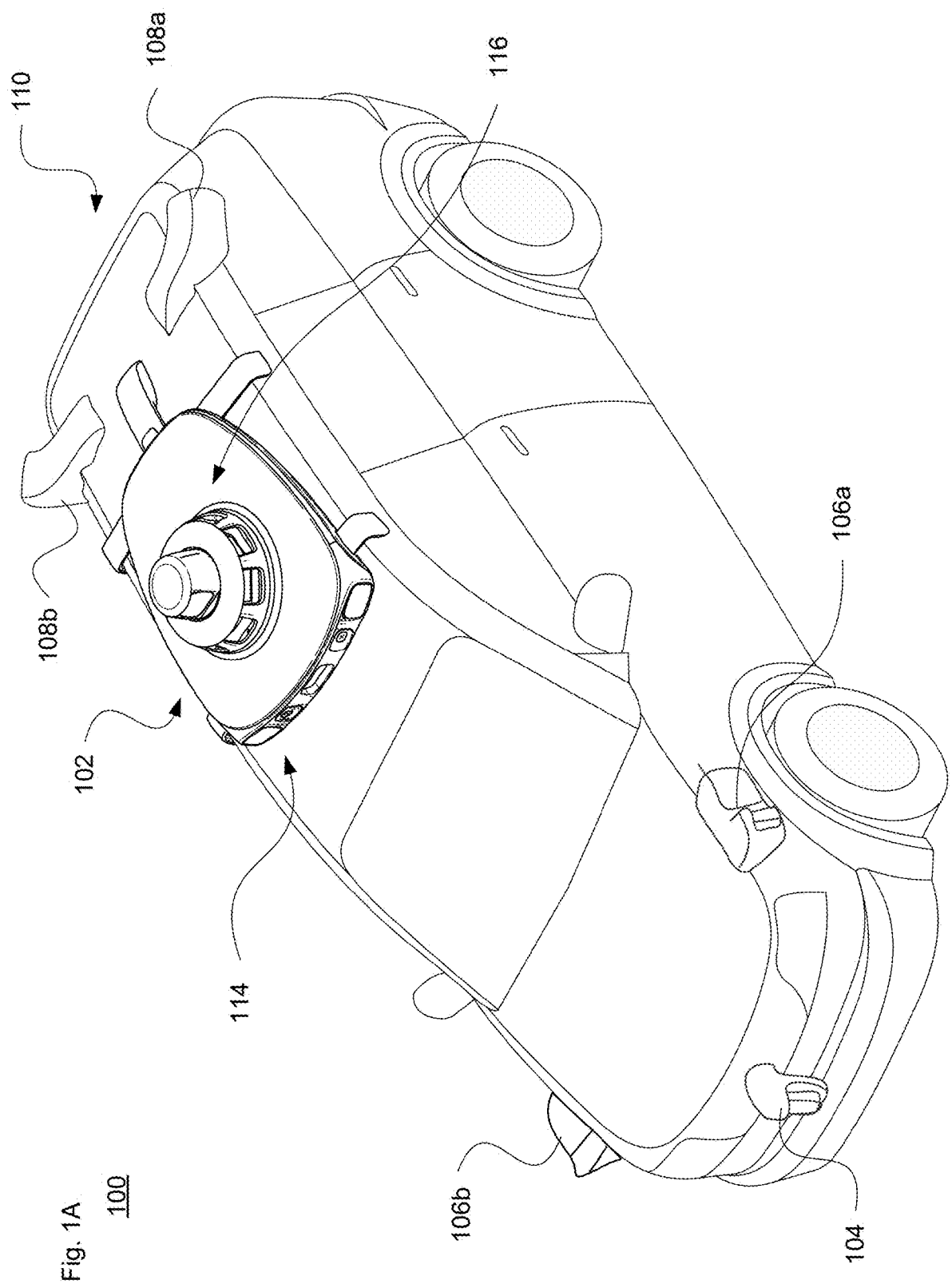
FIGS. 1A-B illustrate example self-driving vehicles in accordance with aspects of the technology.

Wayfinding involves providing information to riders or other users, for instance to find where their vehicle is parked, to go to a specific location to wait for their vehicle, or to exit the vehicle upon arrival in order to get to their destination. Wayfinding in complex environments, such as dense urban areas or during rush hour, can present a particular challenge for riders with vision and cognitive disabilities, but may also affect riders with hearing and ambulatory disabilities or riders with no disabilities at all. Other users such as customers receiving a package, groceries or a food delivery, or a store employee that needs to put those items in the vehicle so they can be delivered, can also encounter wayfinding difficulties.

Autonomous vehicle systems consider safety, applicable traffic laws, and other constraints when selecting where the vehicle should pull over, and this can sometimes result in counterintuitive pickup and drop-off locations for the rider or other user. For example, the vehicle may pull over farther down the road than expected, behind a building, or on the opposite side of the street from the rider or the planned destination. Since the rider of a fully autonomous vehicle cannot communicate with an in-vehicle human driver or ask them to adjust the pullover, it can be inconvenient or challenging for the rider to find the vehicle or desired destination at pickup or drop-off.

There can be various high-level needs for wayfinding to the vehicle at pickup or to the destination at drop-off. Examples of this include the following. Predictability: riders want to know where the vehicle will pull over and be aware of any potential wayfinding challenges ahead of time, before they encounter them. Proximity: riders may want the shortest possible walking distances to and from the vehicle (e.g., curbside pickup/drop-off), although a longer walking distance may be beneficial if it significantly helps pickup and/or drop-off ETA. Simplicity: riders may prefer fewer road users and obstacles to negotiate while wayfinding. Street crossings and large parking lots can be particularly difficult, while curbside can be easiest and/or safest to manage. For instance, avoiding the need to negotiate other road users and obstacles, and in particular crossing the street or navigating unpredictable large parking lots, may be a priority. Flexibility: riders may not want a one-size-fits-all approach, so different tools may be necessary for different needs in different situations for different riders. Patience: riders may want the vehicle to wait long enough at pickup for them to find it, especially when wayfinding may take additional time. Assistance: riders may want help to be available as a backup when they need it, but they may want to complete the wayfinding task independently.

Aspects of the technology incorporate various augmented reality features that enhance wayfinding to provide suitable assistance to a diverse group of riders or other users in a variety of situations. For instance, AR wayfinding can enable autonomous vehicle riders with disabilities to quickly and easily find their vehicle at pickup and their destination at drop-off. As a result, the AR wayfinding features can help to provide greater independence and freedom of mobility for these riders. Such features can also enhance the in-vehicle experience for riders. This may include providing information about the trip or the vehicle itself, since there may not be a human driver in the vehicle to assist the rider.

Example Vehicle Systems

Figure 1B:
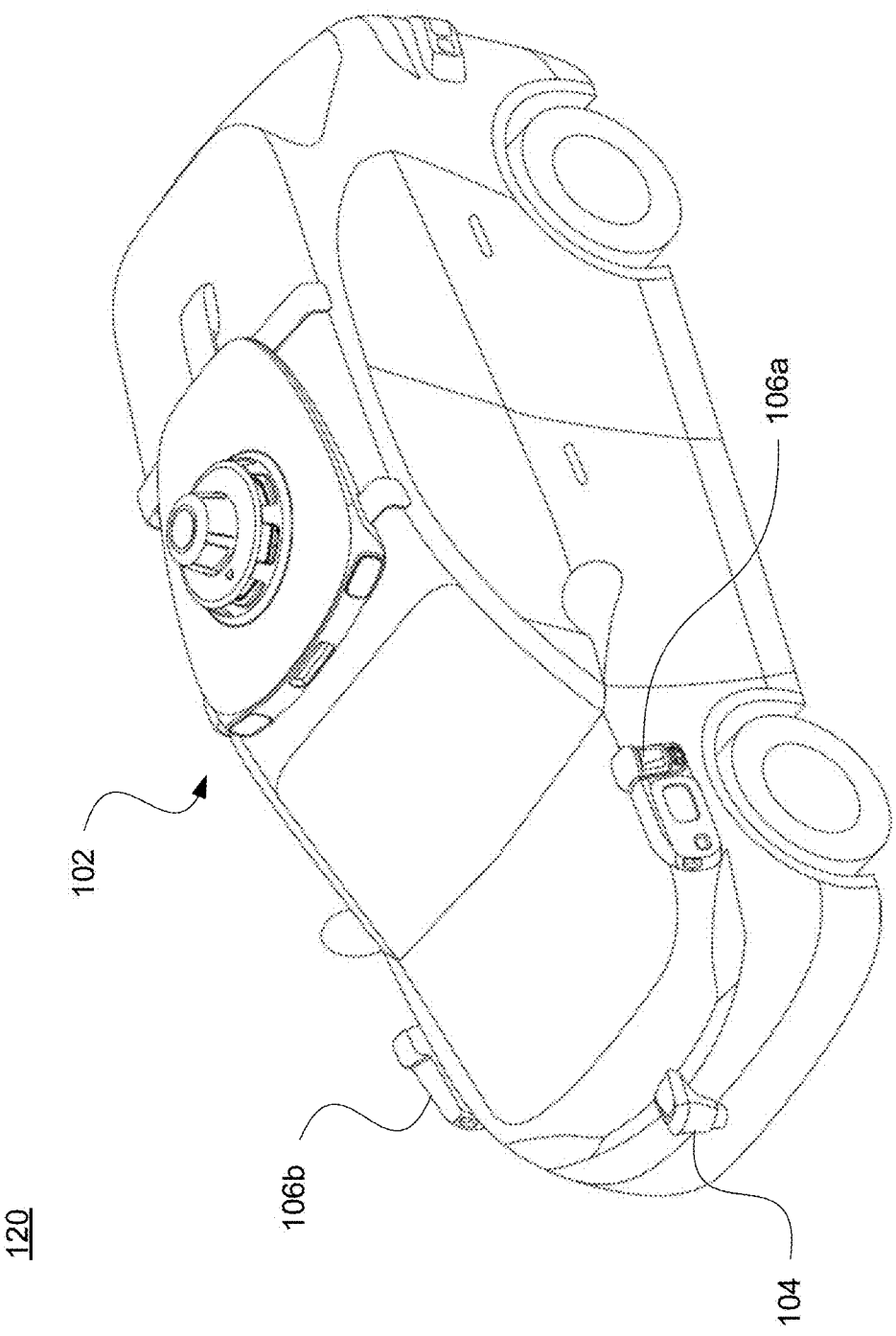
Figure 1D:
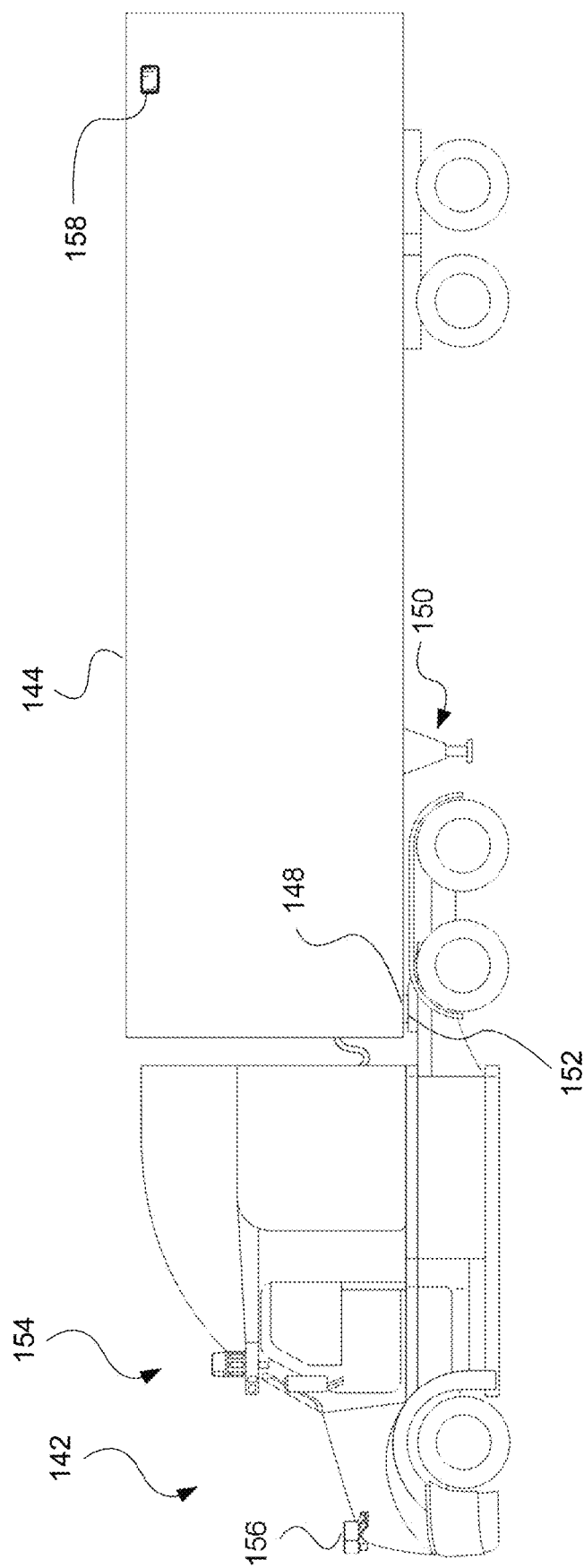
Figure 1E:
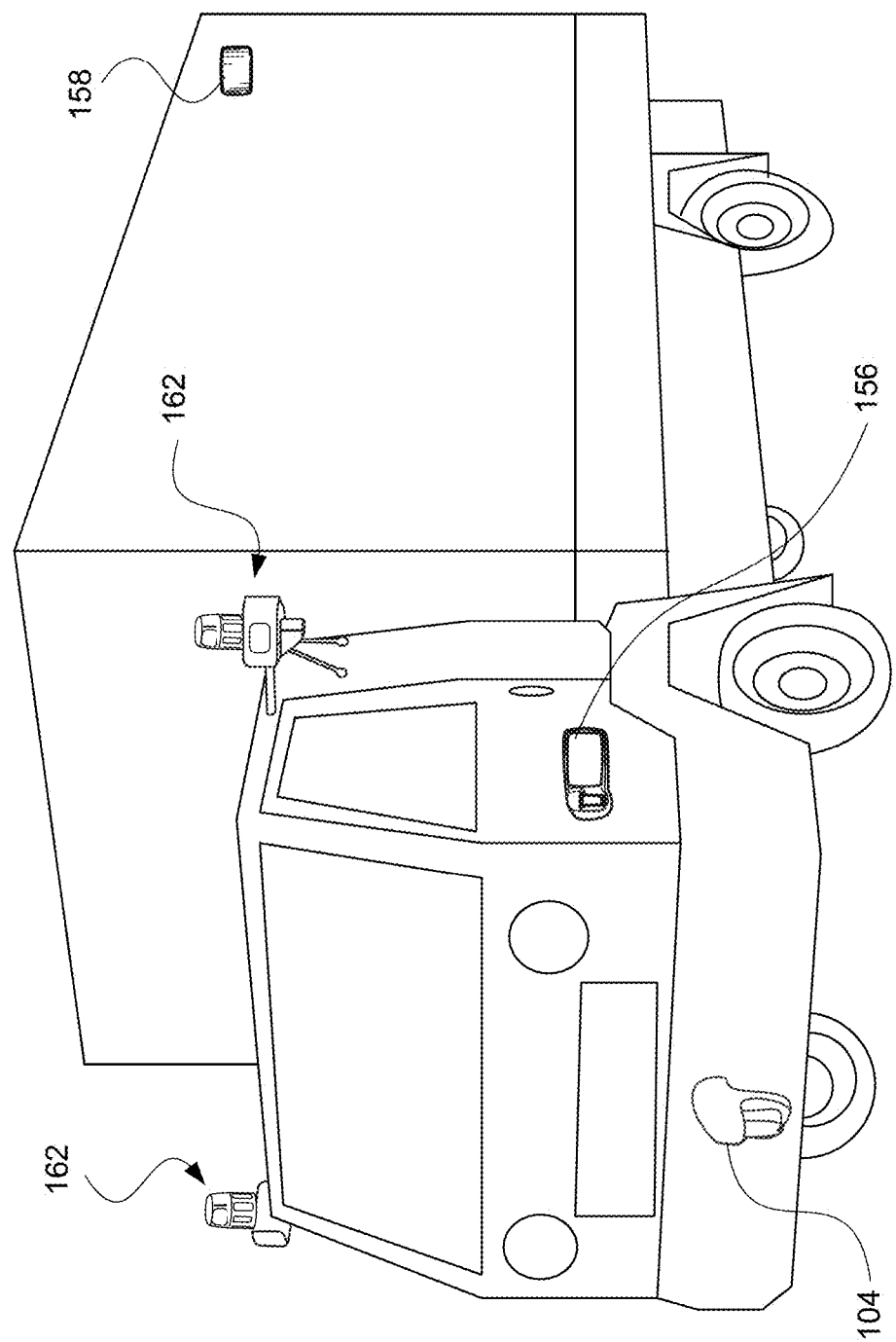

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each defined different levels of automated driving to indicate how much, or how little, a vehicle controls the driving, although different organizations may categorize the levels differently. For example, under current SAE classifications, there may be up to six levels (e.g., Level 0 through Level 5). In the lower SAE levels, the human driver is supported by various automated features such as emergency braking, blind spot or lane departure warning, lane centering and/or adaptive cruise control; however, the human driver must continuously oversee such features. In higher SAE levels, the human driver does not control certain (or all) driving features.

As described herein, in a semi or partially autonomous driving mode, even though the vehicle assists with one or more driving operations (e.g., steering, braking and/or accelerating to perform lane centering, adaptive cruise control, advanced driver assistance system (ADAS) or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of passenger or commercial vehicle including, but not limited to, cars (e.g., couples, sedans, minivans, vans, sport utility vehicles, shuttles, etc.), trucks (e.g., light duty such as classes 1-3, medium duty such as classes 4-6, and heavy duty trucks such as classes 7-8), motorcycles, buses, recreational vehicles, or special purpose vehicles (e.g., low speed vehicles, street cleaning, sweeping vehicles, garbage trucks, emergency vehicles, etc.).

For instance, as shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders, "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 108a, 108b for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck, e.g., a class 7 or class 8 vehicle based on gross vehicular weight rating (GVWR). The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., short range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 144 may also have one or more sensor units 158 disposed therealong, for instance along one or both side panels, front, rear, roof and/or undercarriage of the trailer 144.

The perspective view 160 of FIG. 1E illustrates an example panel truck or other vehicle that may be suitable for local deliveries (e.g., groceries, meals, mail or other packages, etc.), such as a light truck in classes 1-3 or a medium truck in classes 4-6 based on GVWR. Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the truck may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
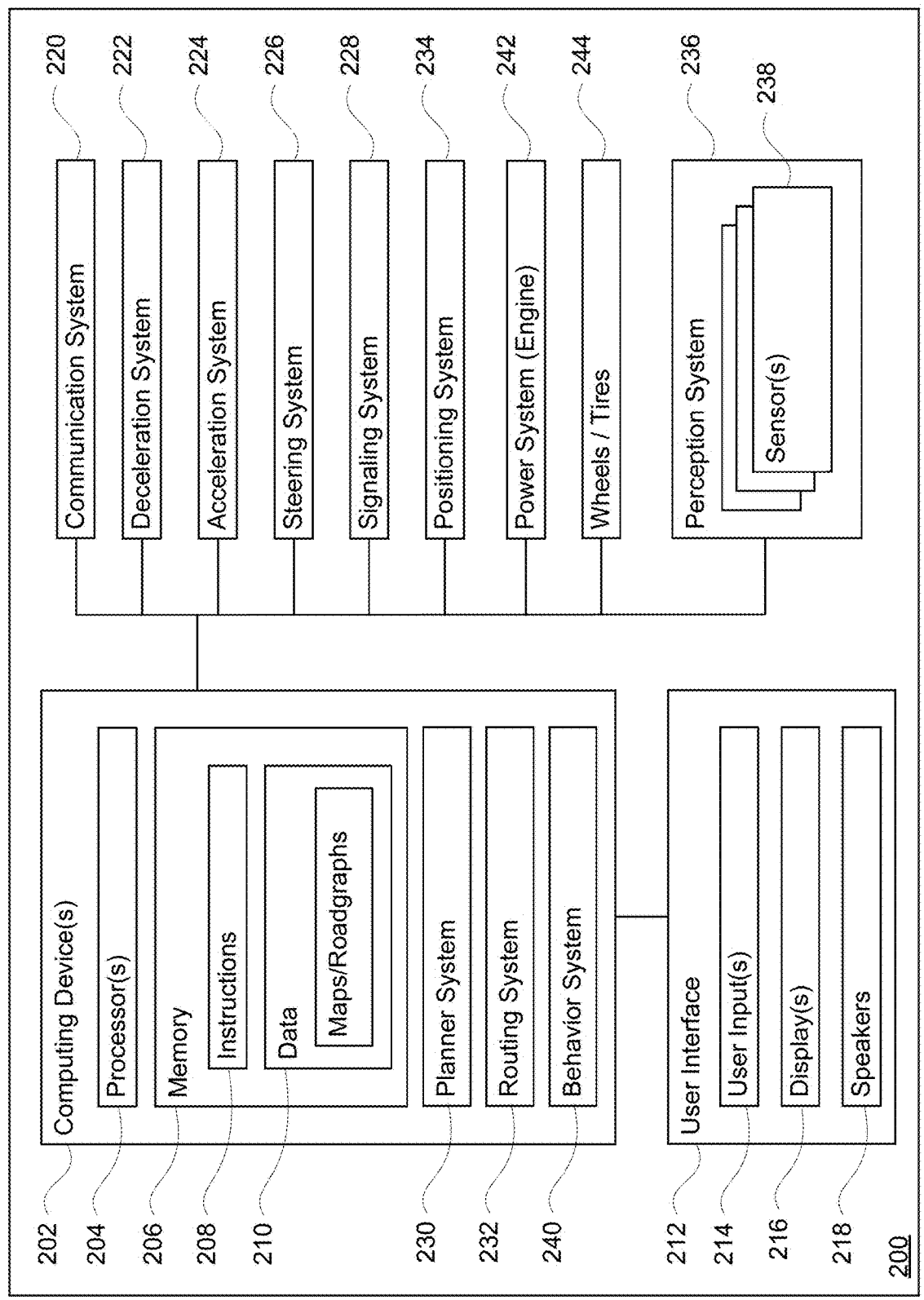
FIG. 2 illustrates components of a self-driving vehicle in accordance with aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle. Some or all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices discussed below or other computing devices), pullover spots, vegetation, or other such objects and information.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a roadgraph as well as relative location information, such as location relative to other cars immediately around it, which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the future based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), change direction (e.g., by turning the front or rear wheels of autonomous vehicle 100, 120 or 160 by steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
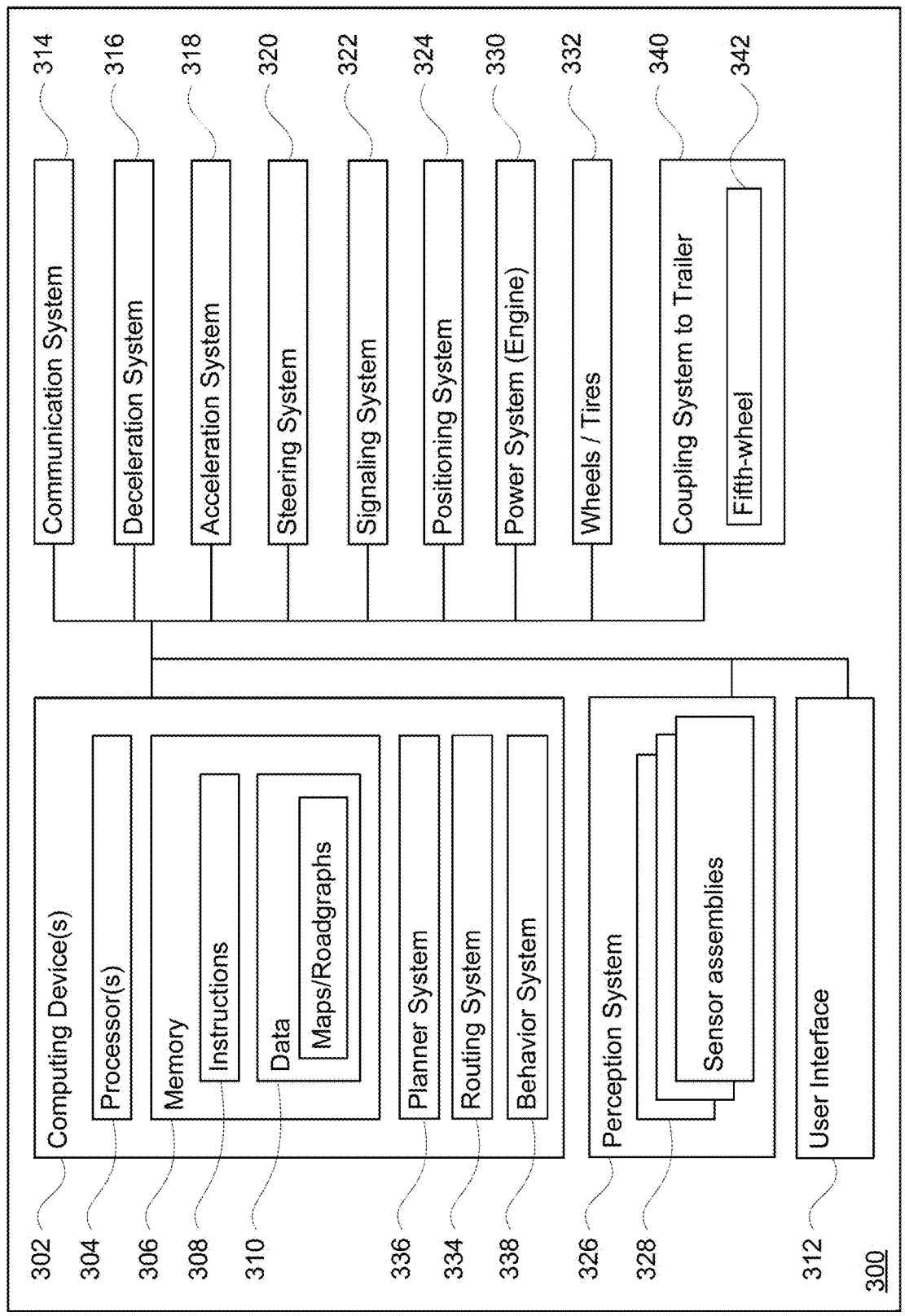
FIGS. 3A-B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a heavy cargo truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs).

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320, signaling system 322, and a positioning system 324, each of which may function as discussed above regarding FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

Figure 3B:
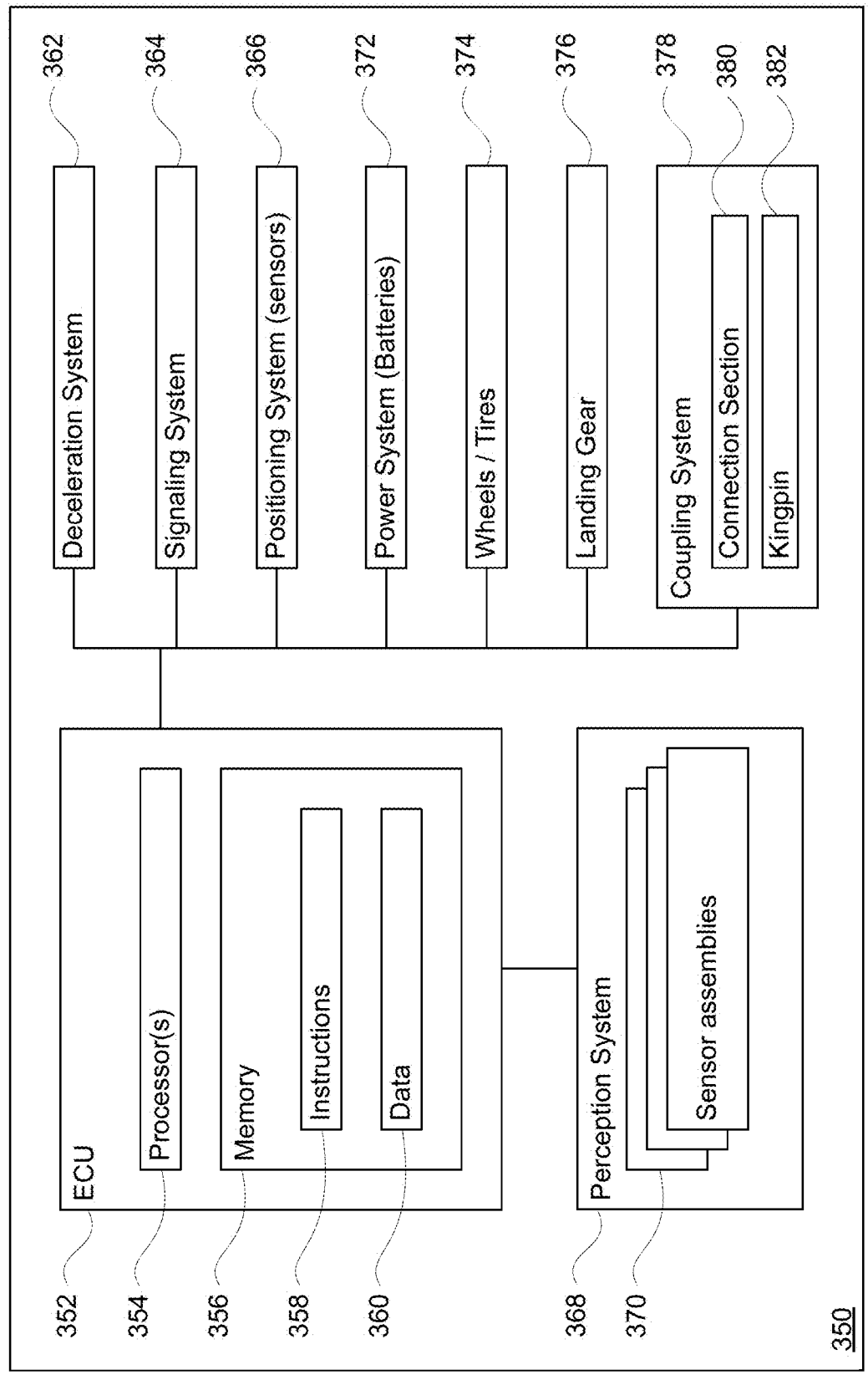

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Example Implementations

As noted above, there are various types of situations in which AR wayfinding can be beneficial to riders or other users of an autonomous vehicle service.

Augmented Reality Live View

Figure 4A:
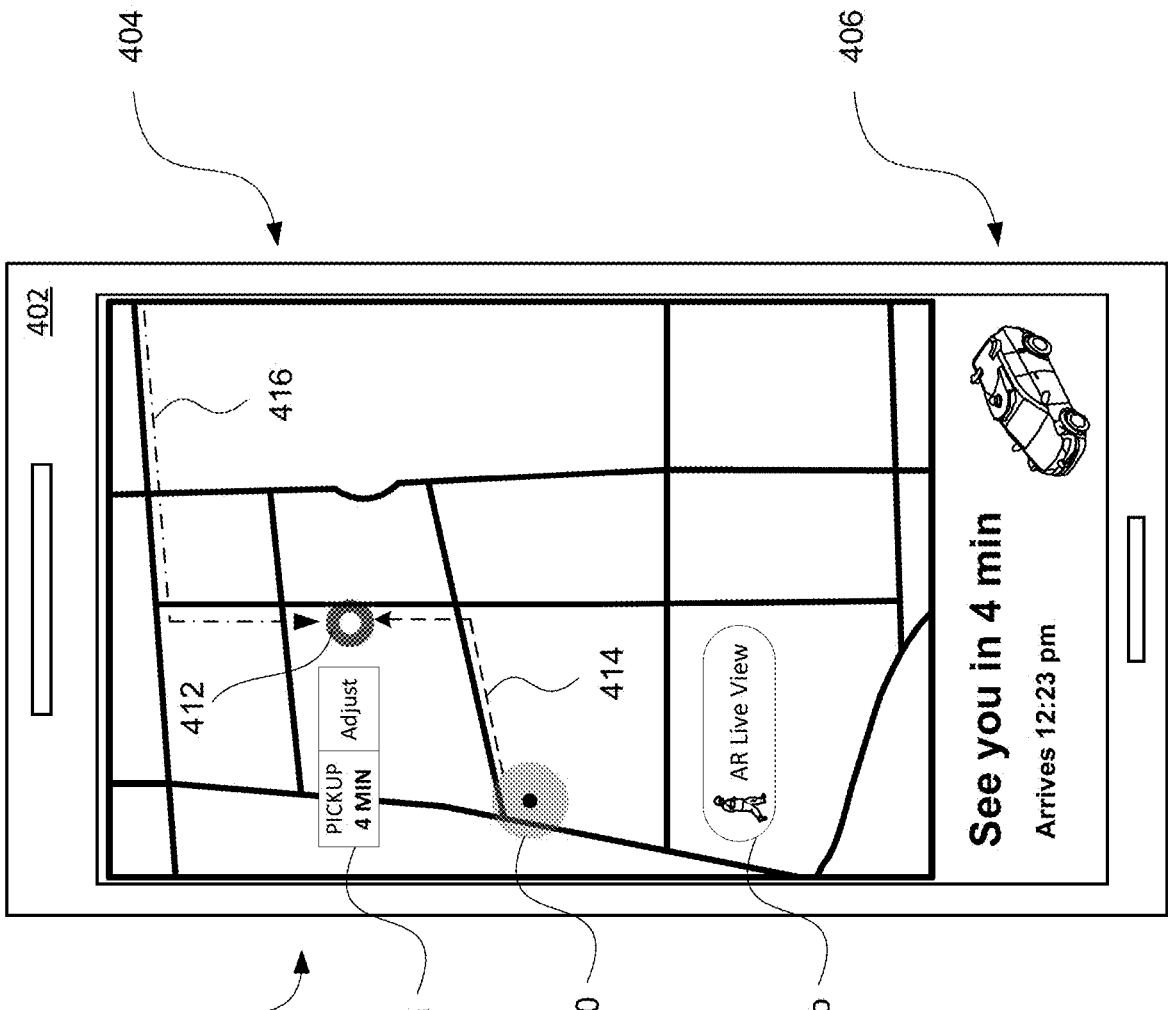

For instance, according to a pickup situation in which the rider is provided with turn-by-turn directions to the pickup location, one or more AR objects can be used with real-time imagery to indicate where to meet the vehicle for pickup. For instance, a map view may be displayable on a client device app, which may run on the rider's mobile phone, wearable (e.g., a smart watch or smart glasses), tablet computer, etc. The app may have a map-focused display with the option to launch an AR live view. FIG. 4A illustrates an example 400, in which the client device 402 includes a displayed user interface (UI) 404. In this figure, one portion 406 of the UI provides basic information about the trip, including an estimated arrival time (e.g., "Arrives 12:23 pm") and/or a relative time (e.g., "See you in 4 min"). This portion of the UI may also provide a graphic or other indicia about the vehicle.

Another portion 408 of the UI presents a map to the user. In this example, the map indicates the current location 410 of the rider, the pickup location 412, a walking path 414 for the rider, and a planned route 416 that the vehicle is taking to the pickup location 412. Additional information can be presented in the map portion 408. For instance, one or more user-selectable icons 418 may be provided. By way of example, icon 418a may indicate to the rider the time until pickup (e.g., "PICKUP 4 MIN") with an option to adjust the location. By selecting the adjust option, the rider may change the pickup location 412 to a closer or more convenient location from their current position. And as shown, icon 418b provides an AR Live View option.

Figure 4B:
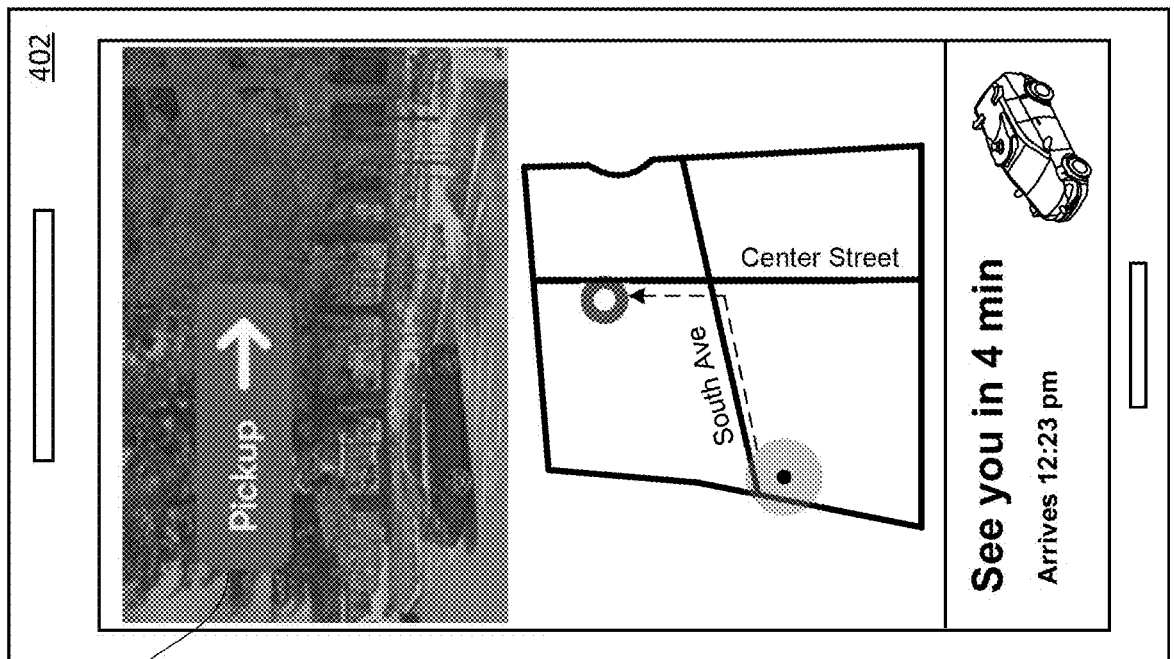

View 420 of FIG. 4B illustrates an example of the AR live view scenario, which can simultaneously show imagery of the rider's surroundings along with a map section tailored to include, e.g., the upcoming walking path to the pickup location. The imagery may be obtained in real time from the rider's client device, or may be generated based on previously obtained imagery for that particular area. As with FIG. 4A, one portion 422 of the UI provides basic information about the trip. Another portion 424 of the UI illustrates the tailored map section. And a different portion 426 presents an AR-enhanced view with the imagery. Here, AR element 428 can be overlaid or otherwise integrated into the display of the imagery. As shown, the AR element 428 can include direction information, e.g., a notification regarding "Pickup" with an arrow showing how the rider should orient their client device.

Figure 4C:
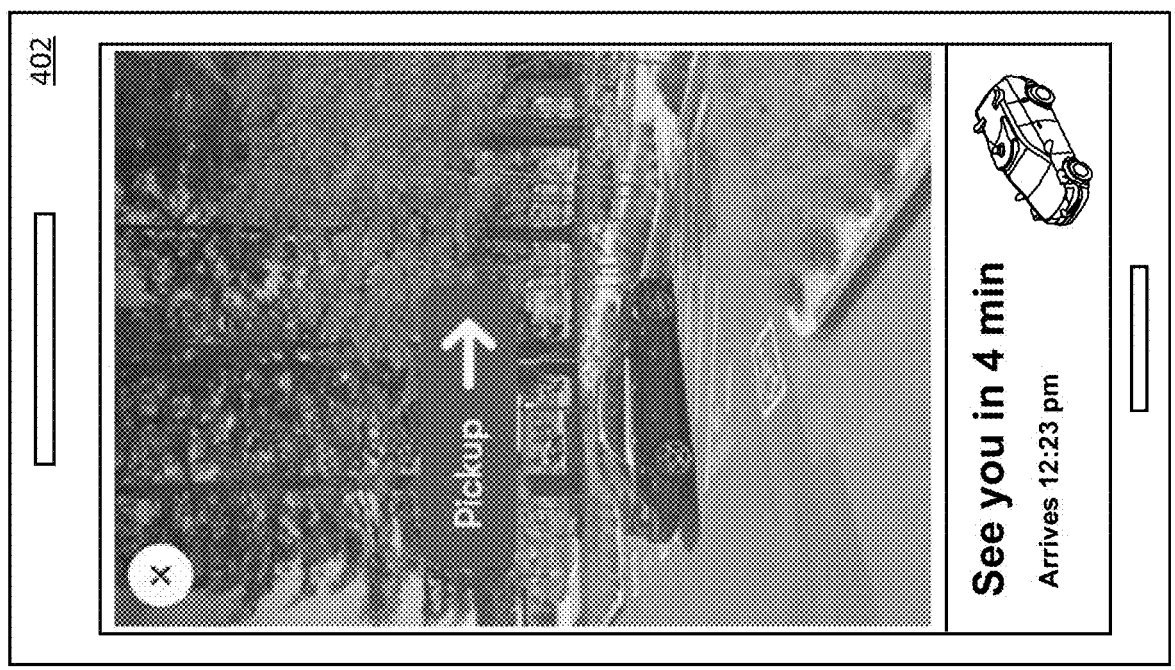

As shown in view 440 of FIG. 4C, the map portion 424 of the UI may be removed (or hidden or otherwise minimized). Here, basic information portion 442 remains, but enhanced view portion 444 expands, such as to provide a more robust view of the rider's surroundings. And as shown in view 460 of FIG. 4D, the AR live view may not include a map or basic information section at all. In this example, the AR live view includes one or more AR features such as directional information as shown by the arrow or compass area 462. Textual information 464 about the directions can also be prominently presented, with or without information 466 about the vehicle itself. In addition or alternatively, the UI may also provide vehicle controls 468, so that the rider may cause the horn to honk or the lights to flash (or the doors to unlock or the windows to roll down), to help identify which vehicle is theirs.

Figure 5A:
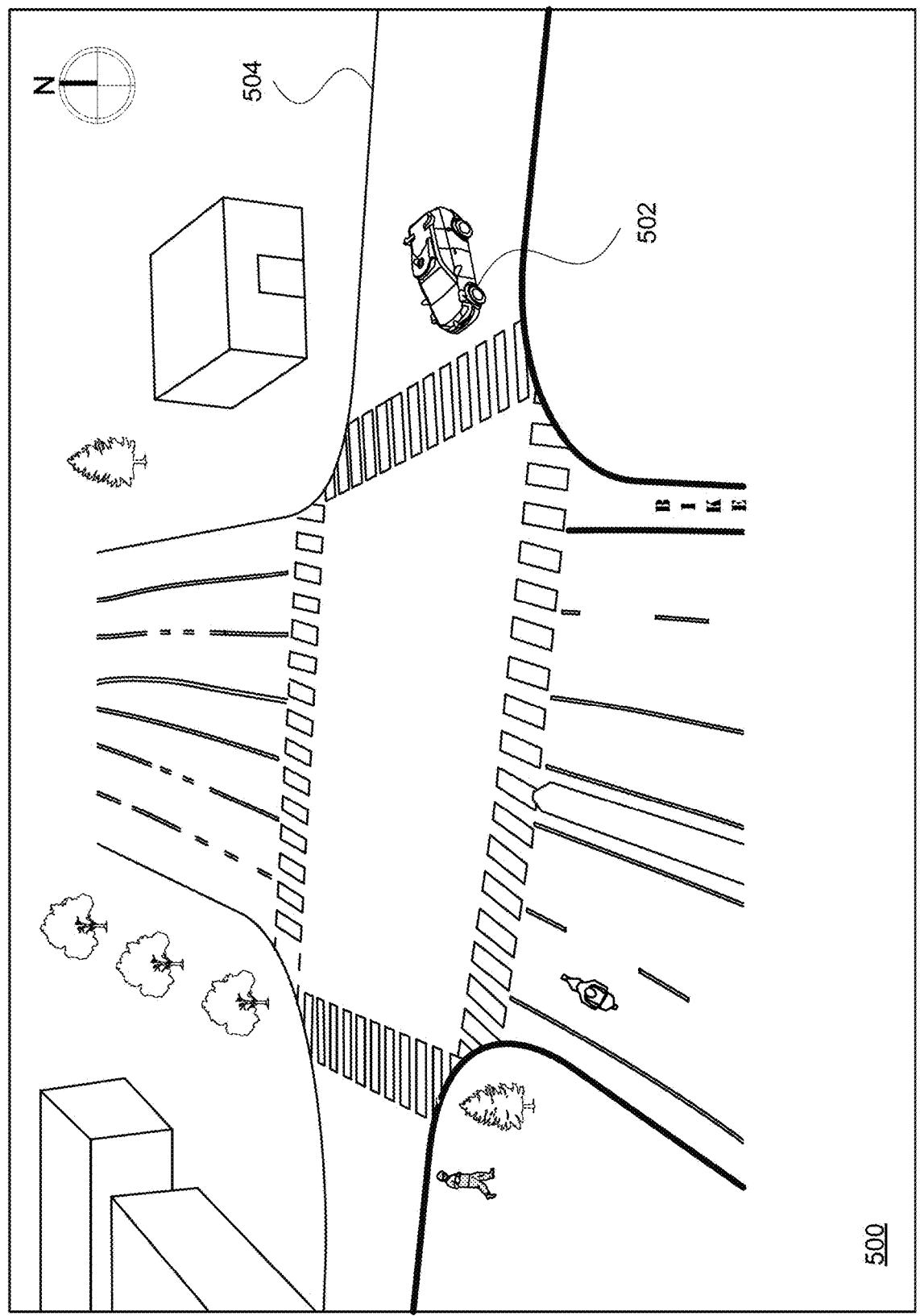
FIGS. 5A-B illustrates vehicle placement in accordance with aspects of the technology.
Figure 5B:
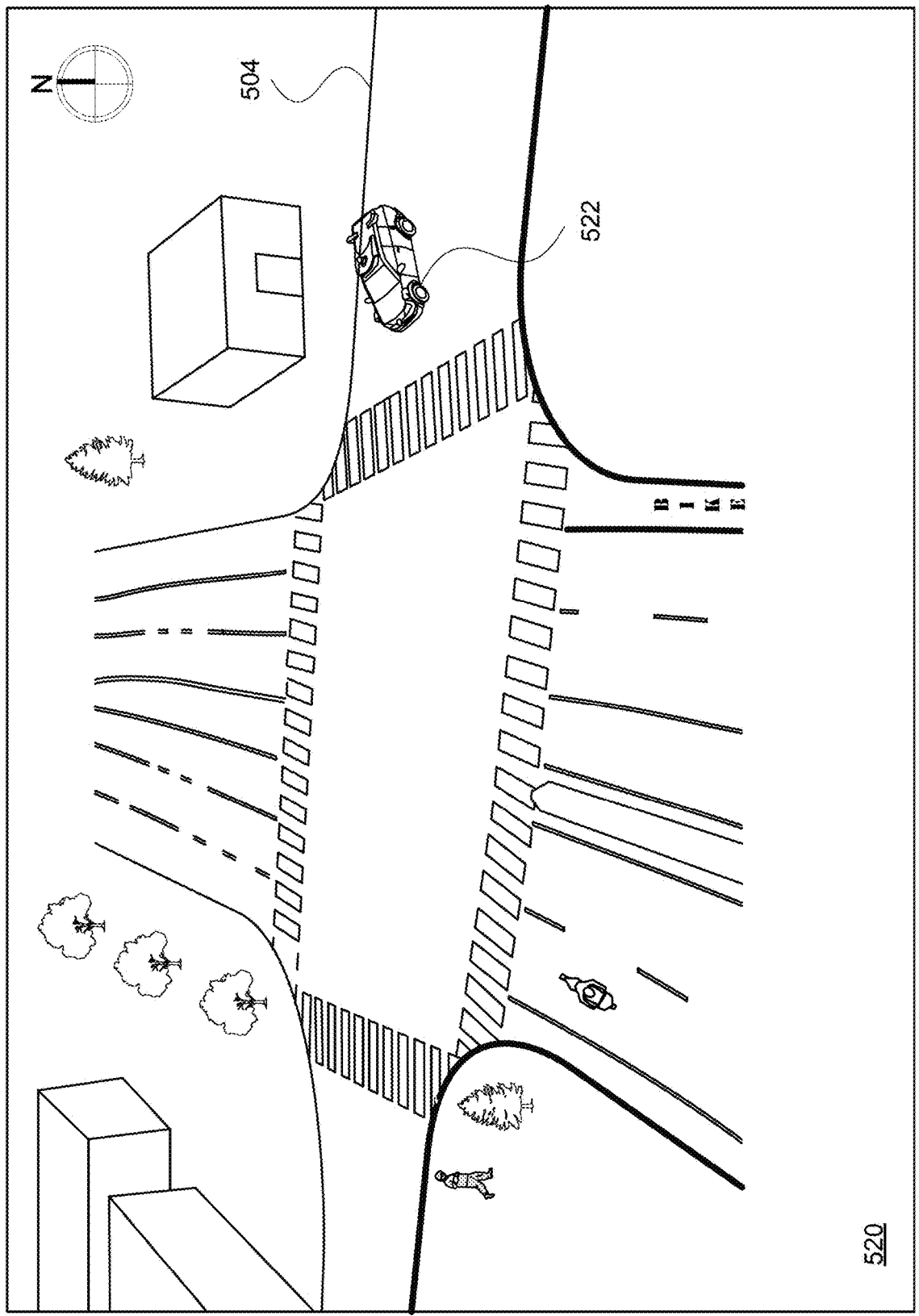

While the information 466 about the vehicle could comprise a pushpin or logo showing where the vehicle is (or is expected to be at a certain time), in another example the AR live view may include a realistic AR representation of the vehicle in the anticipated pickup location. In one scenario, the system (e.g., the rider's client device executing the app) can determine an appropriate size, orientation, placement, etc. of the AR vehicle (or other AR object symbolizing the pickup vehicle). Here, utilizing information about the vehicle make, model, dimensions, etc., the AR object can be appropriately sized, placed and oriented in the live view. In some instances, misalignment of the AR vehicle relative to the curb may be more pronounced than others, giving the impression of less accuracy or realism. For instance, as shown in view 500 of FIG. 5A, AR vehicle 502 is misaligned relative to curb 504 in the AR live view. Here, due to the distance of the vehicle from the curb (e.g., perceived as being 2 or more meters from the curb), the misalignment may be more noticeable than in view 520 of FIG. 5B, where the AR vehicle 522 is positioned close to the curb 504 (e.g., perceived as being within 1 meter from the curb). Thus, according to one aspect, the system may place the AR vehicle or other AR object close to the curb (e.g., no more than 1-1.5 meters from the curb) rather than 1.5-2 meters or more from the curb.

A three-dimensional map of the pickup location with or without a marker, which could be detected by the camera(s) of the client device, could be employed at the actual pickup location to help the system identify a suitable position and scale for the AR object overlay. For fixed stops where vehicles regularly pick up riders at well-defined locations, e.g., specific arrival doors at an airport terminal, the marker can be prominently positioned at such places. For other places with more variable pickup locations, such as a street without designated standing/stopping zones, a marker could be associated with a particular object at the location, such as a mailbox, an awning, a shop sign, or the like. A secondary marker could be positioned on the vehicle itself, which can be used for mapping visualizations and/or graphics superimposed onto the vehicle shown on the client device's UI. The marker(s) can be placed with GPS coordinates, which means the system does not need to associate it with known objects on the scene.

Depending on how close the rider gets to the vehicle (or the pickup location), or if the pickup location changes, the system may adjust the AR vehicle representation. For instance, the size of the representation may be made larger (or smaller) the closer the vehicle gets to the selected pickup spot. Adjustments to the representation can be made to help signal to the rider how far away the real vehicle is away from the pickup spot. This could be done in a variety of ways including changing the color, size, opacity, or showing a status callout.

The location of the representation can move to show a change in pickup location. A visual representation in the AR view can show both the old location and updated location (e.g., with the old location faded out while pointing to the new location), which may be accompanied by a text, graphical, audible or haptic alert. The location may change for several reasons, including adjustment by the rider via the app (e.g., to alert the vehicle to an open spot), by the vehicle (e.g., due to detection of a car or a truck parked in the planned pickup spot using the vehicle's perception system), or by a back-end management system (e.g., based on real-time traffic information obtained from other vehicles in a fleet or from a traffic database).

In some instances, the system may only rely on live imagery obtained in real time from the client device in order to present the AR elements in the UI. However, in other instances the system may leverage imagery or other information from the vehicle's sensor suite to supplement the user's location and imagery. For instance, the vehicle's imagery can be used to help identify landmarks and establish a point of reference for the vehicle location to the user. The system may also use imagery or other information from tertiary sources to confirm the location/scene. Thus, if the environment appears different than expected or unrecognizable in the images from the client device's camera (e.g., due to weather conditions, at night or other low light conditions, or because of sun glare), the information from other sources may supplement or replace the client device's imagery. By way of example, the user may be able to toggle between an AR experience showing their imagery and the vehicle's imagery (or imagery from other sources), via an icon or other control in the app.

According to another aspect, if the rider arrives at the pickup location first, their device may capture imagery of something unknown by the vehicle prior to pickup (e.g., a huge appliance delivery was dropped at or near the original pickup location, the presence of a double-parked vehicle, etc.). This imagery could be shared with the vehicle, which could enable the vehicle's planner and/or routing systems to dynamically adjust and update pickup location a few feet from the original location. This could then be indicated to the rider in the UI. Thus, localized imagery from the client device, the vehicle and/or tertiary sources may be used to modify what is presented in the AR live view on their device. In one example, vehicle imagery or tertiary imagery could be presented even though it was not taken from the exact location or pose of the client device. The system may automatically modify the imagery to reorient, resize and/or align it according to the rider's current location and pose.

User Customization

The rider or other user may be able to customize various AR-related details or the UI in general. This can include selecting the type of object representation, features to highlight the object, or add a voiceover description to accompany the representation. This can help identify which vehicle is the user's when it arrives. For customization of the representation to help identify the actual vehicle upon arrival, the system can reflect some aspect of the customization on the actual vehicle, for example to apply a customized highlight color to a portion of the roof pod such as the upper section having a dome, cylinder or cake-top shape (see 116 in FIG. 1A) or to side sensor units (see 154b in FIG. 1C). Another type of customization is a user-selected vehicle identifier. Users could choose one or more characters with some meaning known only to themselves and/or a color, both of which can then be overlaid on at least a portion of the vehicle (e.g., roof, hood, etc.).

In one scenario, such customization would be performed by the user via the app running on their client device. This may occur during a trip flow once the rider has booked a trip and is waiting for the vehicle to arrive (e.g., an awaiting pickup trip state in the trip flow). There may also be a "trip or vehicle preference" section within the app where the rider can make these custom changes anytime during booking, at pickup or during an active trip. Alternatively, user customization can also be enabled outside of trip flow, especially for anything that is sound customization related. For instance, the app may provide a "demo" or other non-trip mode where some of these customizations can be viewed without scheduling or actively participating in a trip. The user customizations may be stored by a backend system in association with the user's account preferences, for instance as part of an autonomous ride hailing service. Alternatively, the customizations may be maintained locally at the client device for use in conjunction with the app.

Figure 6A:
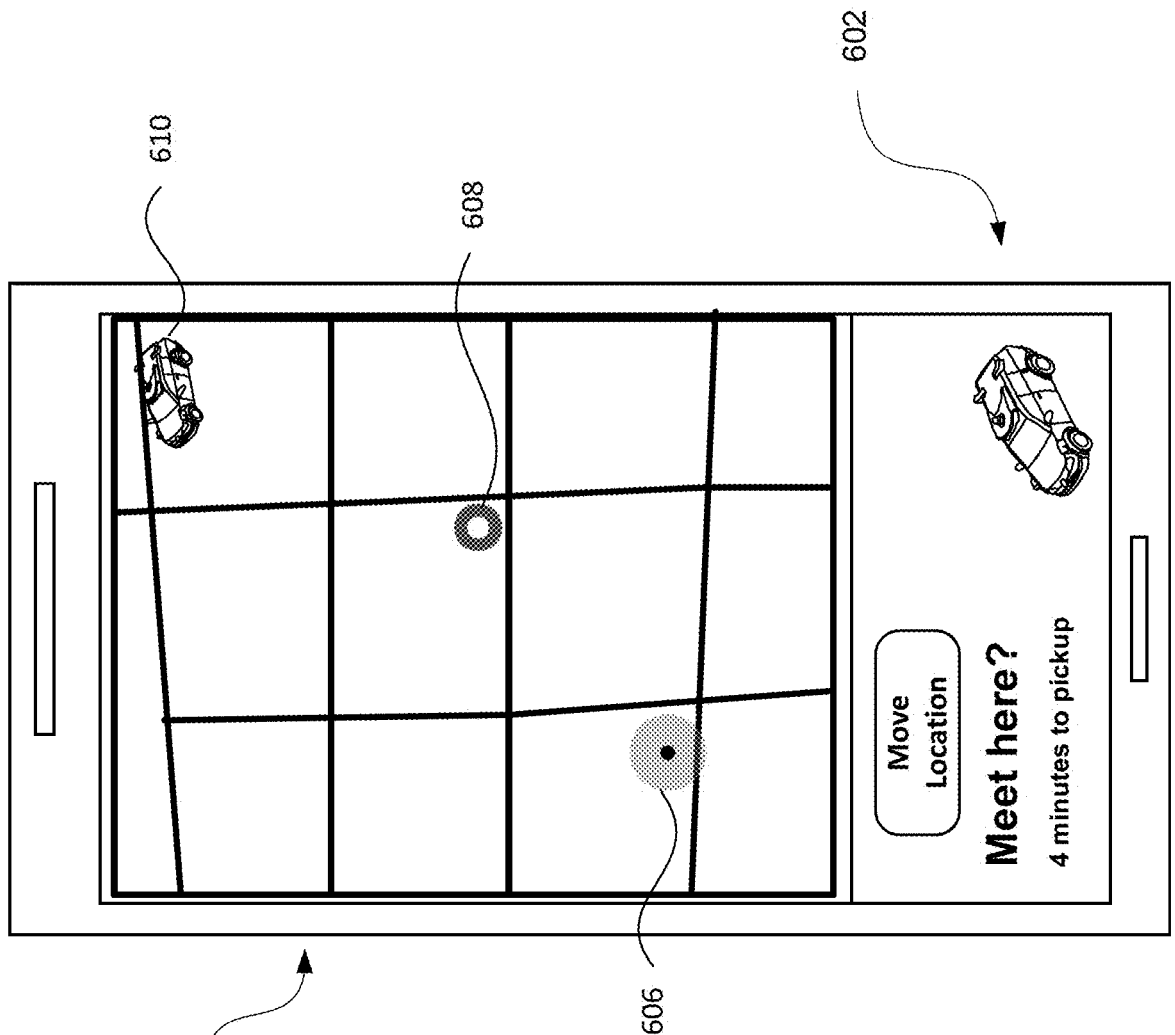

Customization can include the ability of the user to manipulate an AR representation, for instance to move it in order to adjust the desired pickup location. For instance, FIG. 6A illustrates a view 600 of the UI in which a first section 602 provides textual information and one or more buttons associated with modifying a pickup location (e.g., "Move Location"), and a second section 604 presents a map. In this example, the rider's current location is shown by icon 606 on the map, and the scheduled pickup location 608 is also shown. The current position of the vehicle 610 may be shown if the displayed map section encompasses that location.

Figure 6B:
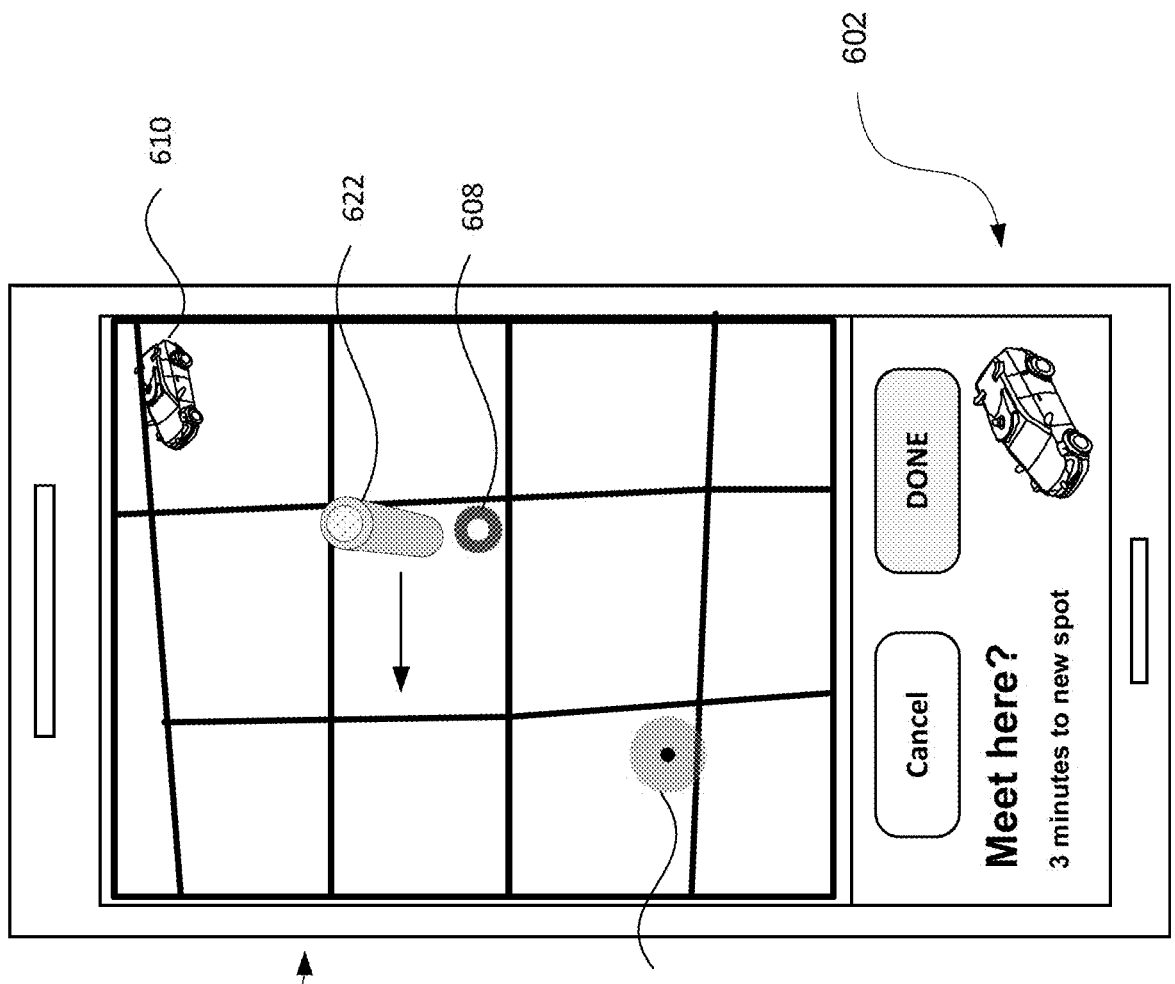

As shown in view 620 of FIG. 6B, once the user selects the Move Location button or otherwise enables the location customization feature, e.g., via a voice command, gesture or haptic feedback, an AR icon 622 is presented with the map. Here, the user can virtually manipulate the AR icon 622, such as by dragging it to the left (as shown by the arrow) using a gesture or tapping the screen at the desired new pickup location. Along the lines of providing suggestions, the system may present a few options for the rider to choose from (e.g. Spot A that's 50 meters ahead is less crowded, or Spot B across the street will save you 3 mins in overall trip time). For situations in which the user tries to select a location that the vehicle would typically avoid (e.g., changing the pickup location to be in a no parking or loading zone), then the system may reject the selection with an explanation of why and prompt for re-adjustment or even provide suggestions based on the general intent. Thus, if the user was selecting a spot in front of a store or a driveway, the system could make an alternative suggestion for the next suitable spot close to the same location. Therefore, rider intent can be one variable to be considered by the system when providing suggestions. Gesture-based manipulation could be done based on detection via the computing device's user-facing camera(s) or other image sensors, and/or other sensors (e.g., a close-range radar sensor). Changing the location can also include updating the estimated pickup time, so the rider can see whether the pickup would take more or less time. As shown in view 640 of FIG. 6C, once the AR icon has been manipulated to adjust to a new pickup location, the user can choose "DONE" to confirm that location or "Cancel" to discard it. Here, new pickup location 642 is illustrated on the UI. Upon confirmation, the client device sends the updated location information either to the vehicle or to a back-end fleet management system that coordinates pickups.

Figure 7:
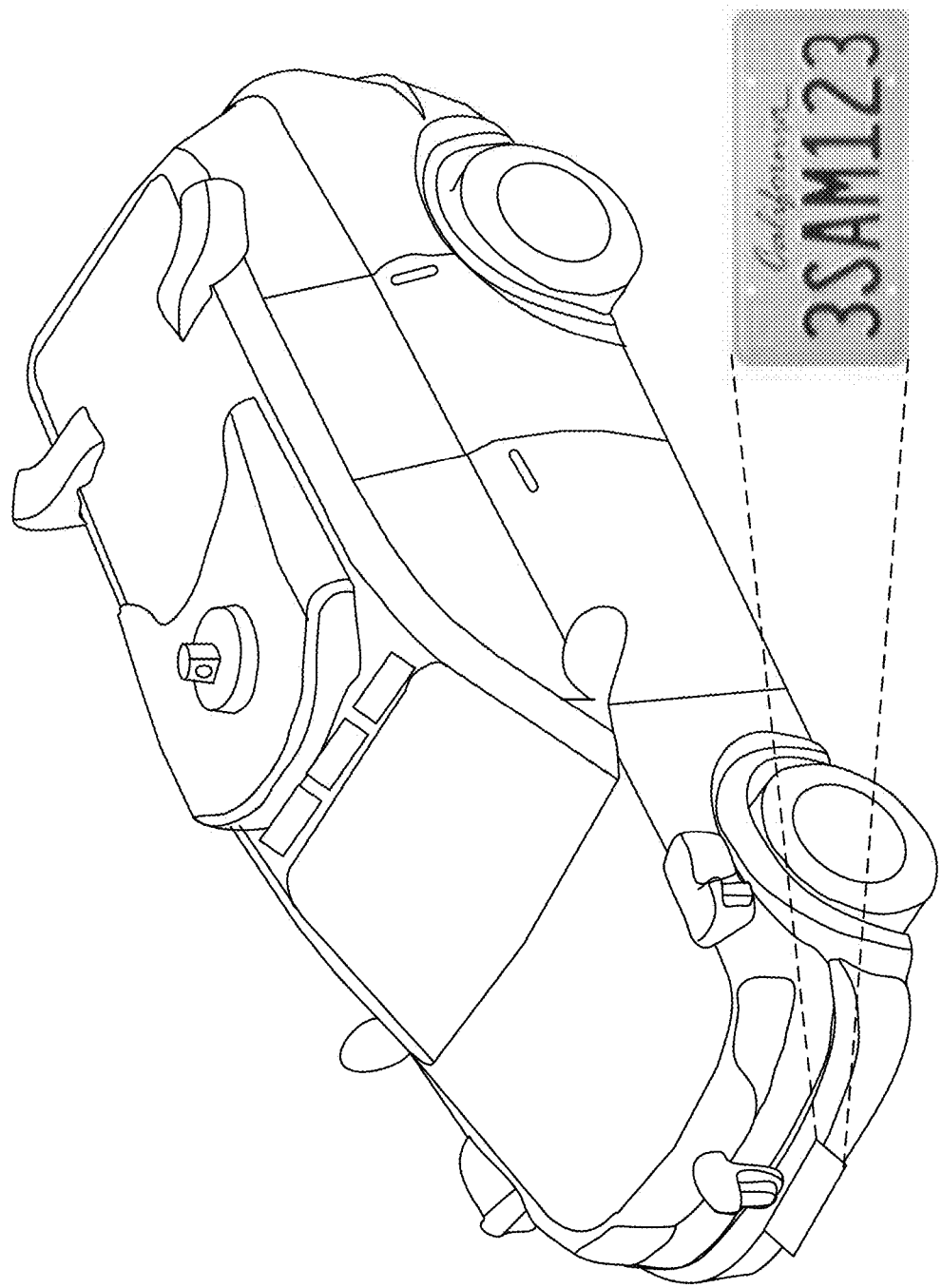
FIG. 7 illustrates an example of enhanced vehicle information in accordance with aspects of the technology.

The user may also interact with an AR representation or otherwise use the app on their device to obtain additional details associated with the trip. For example, as noted above regarding FIG. 4A, the portion 406 of the UI may provide a graphic or other indicia about the vehicle. Here, when the user taps or otherwise selects (e.g., via a gesture or voice command) the vehicle graphic, information about the vehicle can be presented in an AR view. This can include enlarging the license plate as shown in example 700 of FIG. 7). Other information about the vehicle that can be presented to the user include a vehicle ID that is not the license plate or a sound(s) that the vehicle will play at pickup (if enabled).

Even status information such as if the vehicle will be locked on arrival, or whether the car will be operating in an autonomous driving mode could be presented via the UI. Another interactive aspect allows the user to "decorate" the vehicle or to customize its appearance in AR on the UI. This could be a value-added feature, in which the user may purchase a vehicle wrap to be shown in the AR view for the current ride or as a default user preference for any ride.

In addition, riders can also explore features of the vehicle, such as to understand more of the technology and sensors on the vehicle. By way of example, tapping on a sensor housing shown in the vehicle's AR representation may result in a short description about lidar, cameras, radar or other sensors and what the vehicle uses such sensors to detect. Other "info-tainment" scenarios are also possible, any of which can give the vehicle a virtual personality. By way of example, the vehicle could 'talk' using speech bubbles or some other graphic representation to 'answer' back or inform riders. For instance, the rider could 'chat' and see what the vehicle says in response (which can be particularly beneficial when the surrounding environmental sound makes it too loud to hear anything over the speaker. Thus, if a user asked (via chat or selecting options in the app) "can I sit in the front seat?", using the AR feature, the vehicle could 'respond' in a chat bubble and simultaneously even indicate which side the rider can enter to sit in the preferred seat. Or the vehicle could 'chat' through the next steps needed at pickup. Thus, if the AR feature is active when the vehicle arrives at pickup—the vehicle's avatar could "chat" that when the vehicle arrives, to make sure to use the app to unlock the car doors. Here, the interaction may even highlight what to expect when the rider does this, e.g., handles of the vehicle doors will pop out. The vehicle could provide visualized instructions for the rider to step back so the vehicle can complete pullover and not block traffic. Or, if for some reason the vehicle was unable to complete the pullover maneuver and essentially 'drives by', then the 'chat' bubble could inform the rider of the reason why, such as " . . . be right back—couldn't pullover in time due to the traffic behind me".

Contextual Information

Figure 8A:
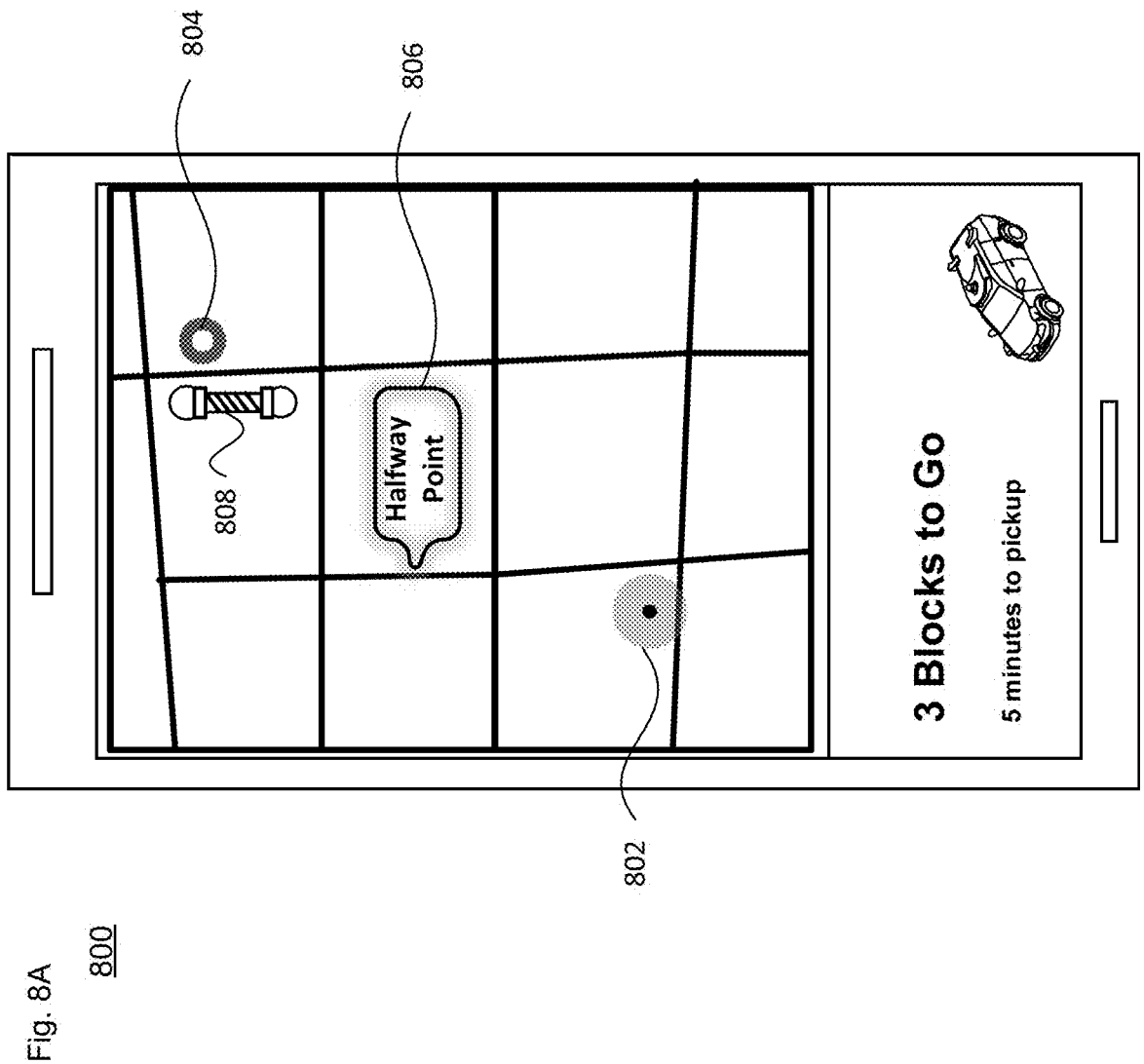
FIGS. 8A-D illustrate user interface examples relating to pickups or deliveries in accordance with aspects of the technology.

In one example, signposts or other visual representations can be included in the UI to indicate to the person that they are moving in the right direction. Contextual signals about landmarks, points of interest or "anchors" can help guide the user. FIG. 8A illustrates one example in view 800. Here, the rider's current location 802 is shown in relation to the pickup location 804. A contextual signal 806 may be overlaid in the map view as shown or the imagery portion of the AR live view. For instance, the signal may indicate where the current halfway point is between the rider's location and the pickup location. An anchor symbol or other icon 808 may be associated with a physical landmark, point of interest or other object at, adjacent or within sight distance of the pickup location. In this example, a barbershop symbol is presented to indicate that there is a barbershop or salon across the street from the pickup location.

As the person is walking, the system may indicate on the UI that they are getting "warmer" (i.e., closer) to the pickup location. This can be done in a variety of ways, including showing distance to the pickup location on the map or AR live view (e.g., 10 feet), heading such as via a compass or pointer (e.g., straight ahead, to the left, or right), color, device haptics to give feedback to the user they are on the right direction (getting "warmer") and getting closer, etc. In addition or alternatively, the UI may indicate how close the rider is to the vehicle or pickup location by changing the color of the path on the map, or by changing the color of an AR feature in the live view. In some examples, the UI may illustrate animations of the path as well as changing the color of the AR feature in the live view. Additional graphics, such as arrows or other indicia, can be presented on the UI to help indicate turns.

Figure 8B:
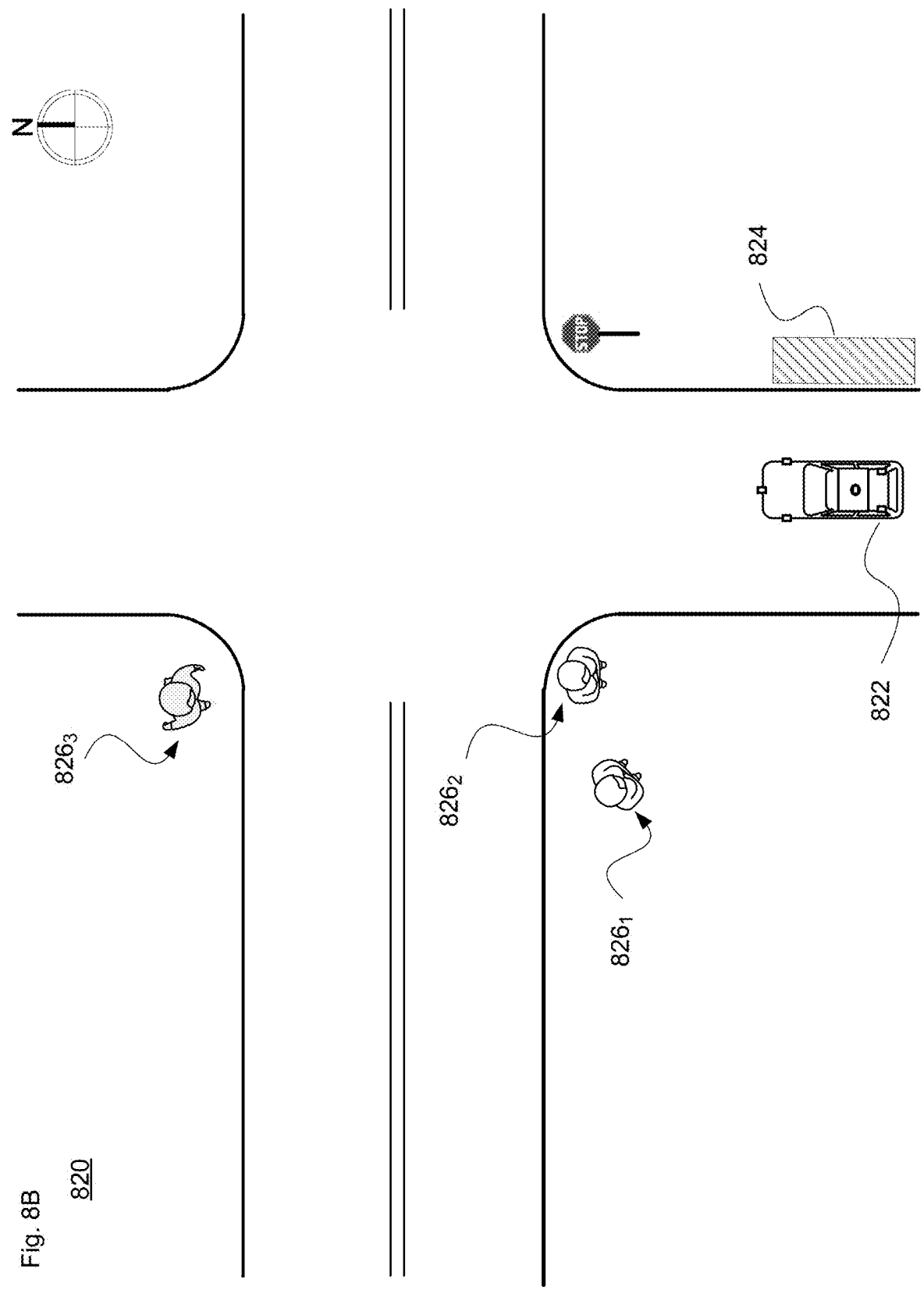
Figure 8C:
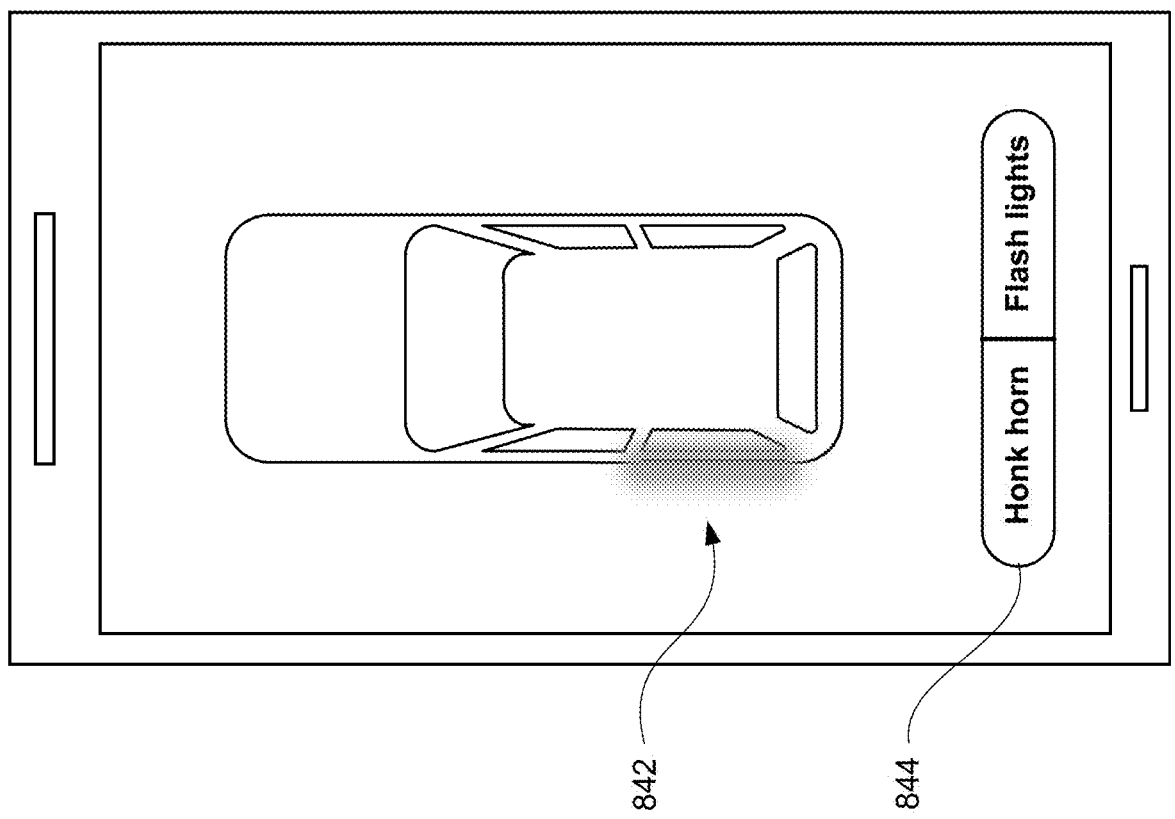

Once the person is close enough, e.g., within 5-25 meters or within sensor detection distance, the vehicle may be able to identify the person as the rider. For instance, view 820 of FIG. 8B shows a scene 820 in which the vehicle 822 has arrived at pickup location 824. As shown, there may be different pedestrians 8261 . . . 8263 in the nearby environment. Based on various information, such as geolocation information from the rider's client device and sensor information from the vehicles perception system, the vehicle may determine that pedestrian 8261 is the rider. Determining which pedestrian is the rider could result in a door being unlocked or opened, or providing an indication to the person that the vehicle knows they are there, thus proactively communicating with the user by having the vehicle flash certain lights when its perception detects that the user is looking at the right vehicle. Other sensors or features could provide such proactive communication to the user, such as flashing a "Hello" message or playing an audible greeting. Furthermore, such vehicle indications can also be mirrored in real time in the AR view. Considering the scenario of FIG. 8B, even though the pickup location 824 is located on the east side of the road, given the rider's current location the vehicle may open the left rear door of the vehicle facing the west side of the street. Here, as shown in view 840 of FIG. 8C, a top-down view of the actual pickup vehicle is shown. An AR enhancement 842 has been added to the imagery in order to highlight the left rear door, so as to indicate to the rider that that is to the door to enter. And similar to the example in FIG. 4D, this interface may also include icons 844 to honk the horn or flash the lights, or even unlock the specific door that the rider will use.

Figure 8D:
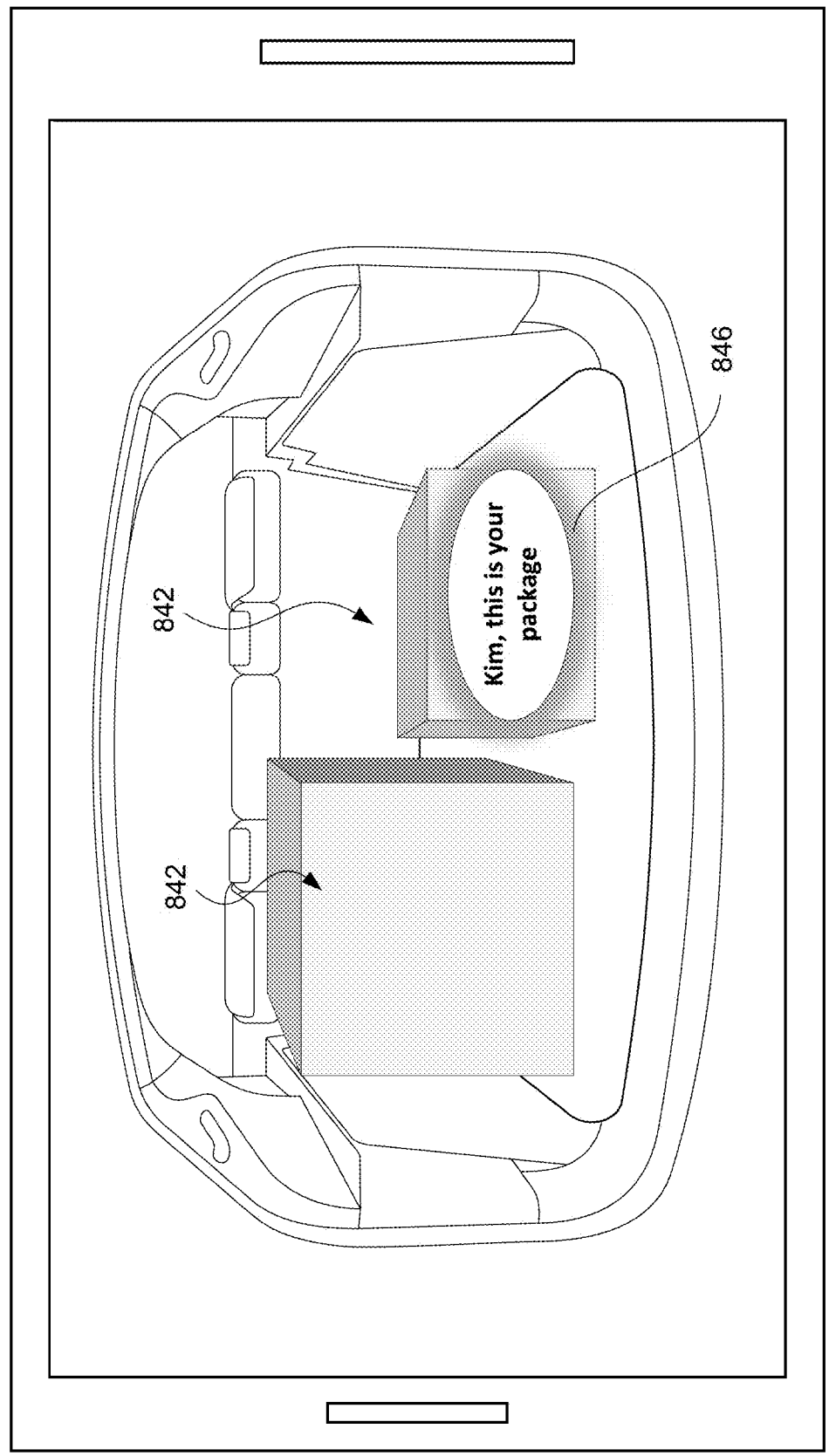

This or other boarding instructions may be presented in an AR live view, as text or other graphics displayed along with the map, as audio and/or using haptic feedback to the rider. The vehicle may communicate directly with the user's client device to pass on the relevant information so that the enhancement could be generated on the client device UI. Alternatively, the information may be relayed via a back-end fleet management system. Such information can be communicated adjacent to the AR representation that shows the vehicle's intended pickup location. This natural endpoint lends itself toward encompassing information the rider needs to know about the pickup. This UI treatment may change based on the rider's distance from the pickup endpoint. For example, if the rider is still several minutes away from the endpoint, the endpoint presented to them may be a simpler (e.g., stylized) representation of the vehicle (or even a dot) with vehicle ETA. As they approach the pickup location, this representation can morph into a virtual vehicle. While at the pickup spot, the vehicle route can be drawn on a non-occluded portion of the road, with the ETA and other relevant information either attached adjacent to the vehicle AR representation or route As noted above, in some situations the vehicle may be used for package deliveries instead of passenger pickups. Here, the UI can include an AR enhancement to identify where the package is located within the vehicle or along the vehicle (e.g., in an exterior facing compartment or on a roof rack), or which item(s) is (are) the correct one(s). For instance, view 860 of FIG. 8D illustrates an image of the vehicle's trunk displayed on the UI of a client device. Here, two packages 862 and 864 are shown. This could be real-time imagery taken by a camera of the vehicle's perception system that is located in the trunk area, or an image taken upon loading of the packages before the vehicle begins to deliver them. Alternatively, a graphical representation of the trunk and package area may be presented, e.g., as a line drawing. In this example, the user's package (package 864) is indicated with an AR object 846 or other indicia, which may include text or other graphics presented to the customer via the UI. The indicia can provide details about the package (e.g., approximate weight or size so the customer can see how heavy or bulky the package is, a barcode or QR code, information about package contents, package temperature, delivery information, etc.). The indicia can also identify whether there are multiple packages for the customer. For instance, with a grocery or food delivery, the indicia can let the customer know how many bags are in the order, including which bags have fragile items like eggs or bread. In cases where doors need to be secured and locked (e.g., for prescription medication deliveries, expensive items or other items requiring special handling), the user may see that the vehicle is locked within the AR live view. The user can then use the app to unlock the door or trunk upon their arrival. The above would even apply for the service to load the delivery vehicles. Here, the AR UI can provide indication of ideal placement or configuration for orders given the route for delivery or time sensitive deliveries.

Figure 9B:
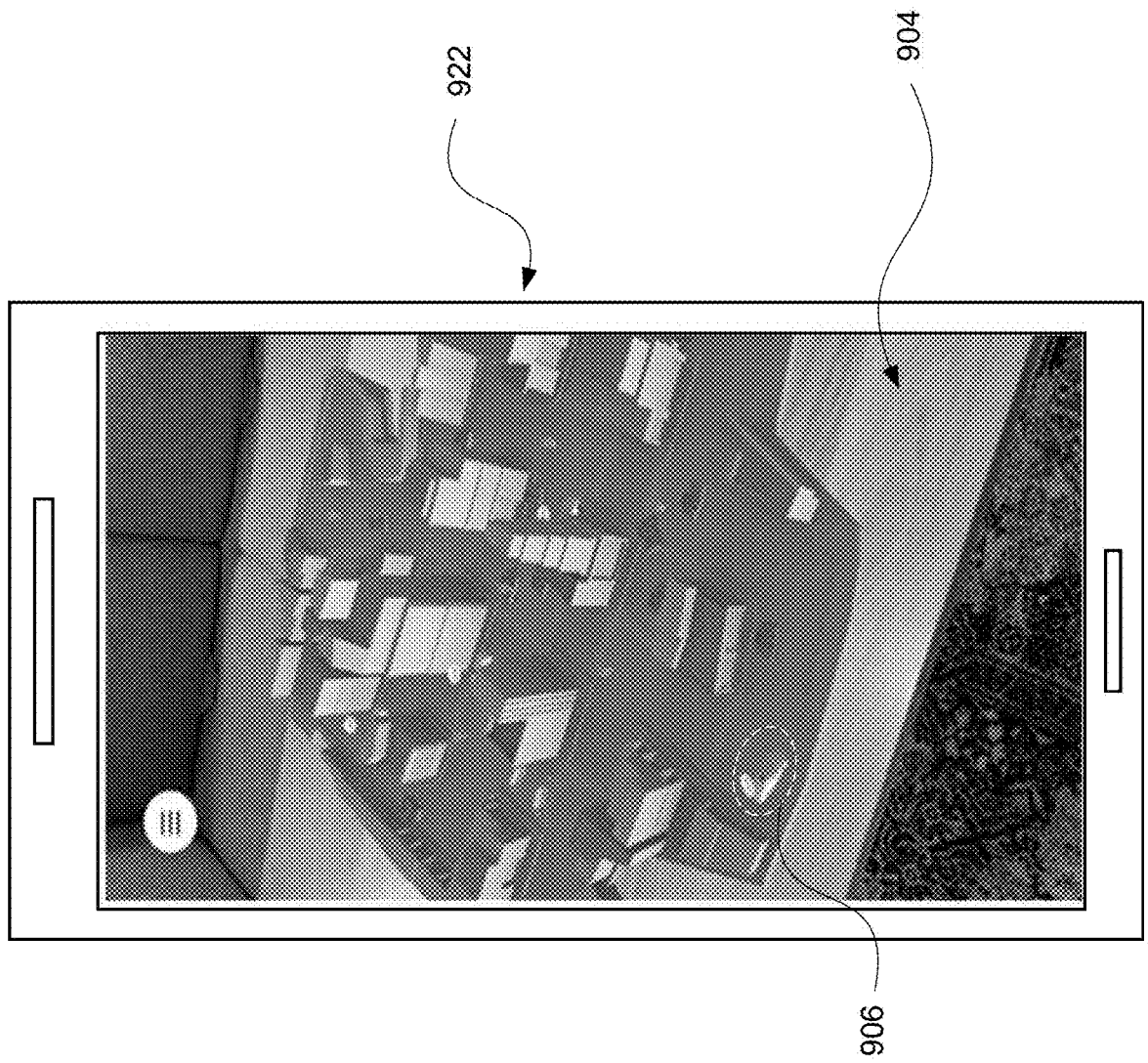

Another pickup-related feature that can be presented to a rider on the client device UI is a virtual information stand (e.g., a virtual kiosk). The virtual information stand can be positioned anywhere in the AR live view to help give the person a better sense for where the vehicle is and when it will arrive. This can include a video-type presentation showing a virtual vehicle object driving toward the pickup location (e.g., as the actual vehicle moves in real time, showing its prior movement over the last 5-20 seconds or more or less, or its projected path over the next 5-30 seconds or more or less). Here, the information stand may be presented as a 3D (or 2D) map that provides information about the vehicle's ETA (e.g., arriving in 3 minutes) and also provides a 3D (or 2D) map showing the vehicle's path in real time. FIG. 9A illustrates an example view 900 of a virtual information station. As shown in this example, a 3D map is presented in a first (lower) area 902, and trip information is presented in a second (upper) area 904. A representation 906 of the pickup vehicle is shown in relation to surrounding buildings and/or other landmarks. The virtual information stand may be overlaid over real-time imagery 908 taken via the camera(s) of the client device. FIG. 9B illustrates another example view 920 as a virtual tabletop 3D map 922 overlaid on real-time imagery 924, showing a representation 906 of the pickup vehicle as it moves toward the pickup location. In addition, the virtual information stand may present "demo" rides or educational snippets as infotainment while the rider is waiting. For instance, the rider may select to "watch" in 3D: what to expect for their first ride, what happens at pullover, how the vehicle (or back-end fleet management system) picks a route or a pickup spot, etc.

Figure 10B:
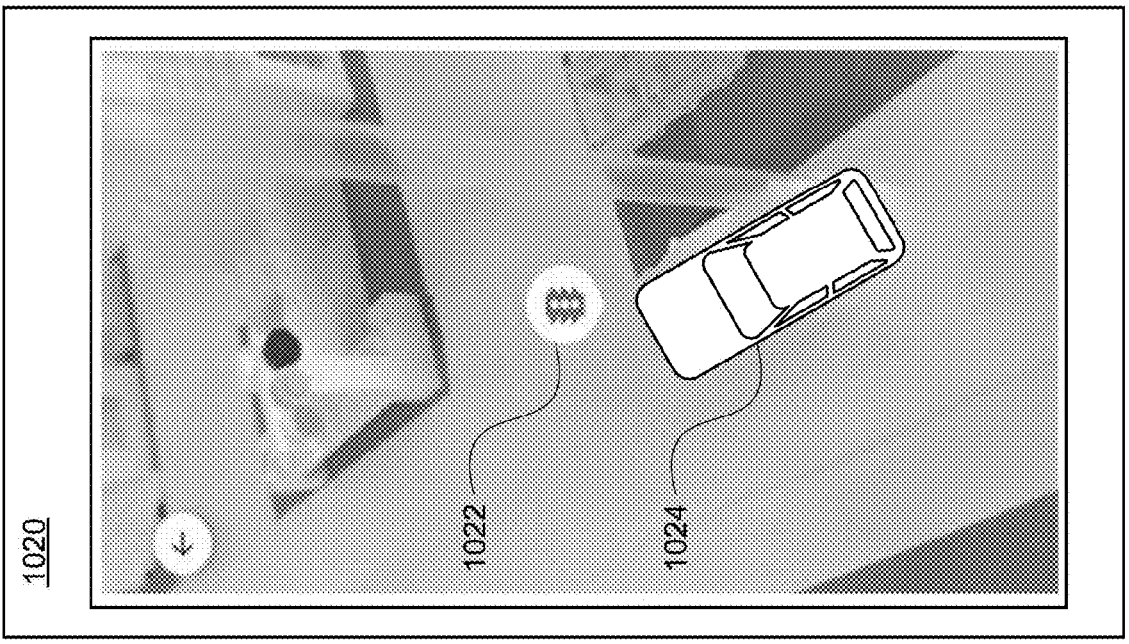
FIGS. 10A-B illustrate examples of virtual information presented using an in-vehicle display device in accordance with aspects of the technology.
Figure 10A:
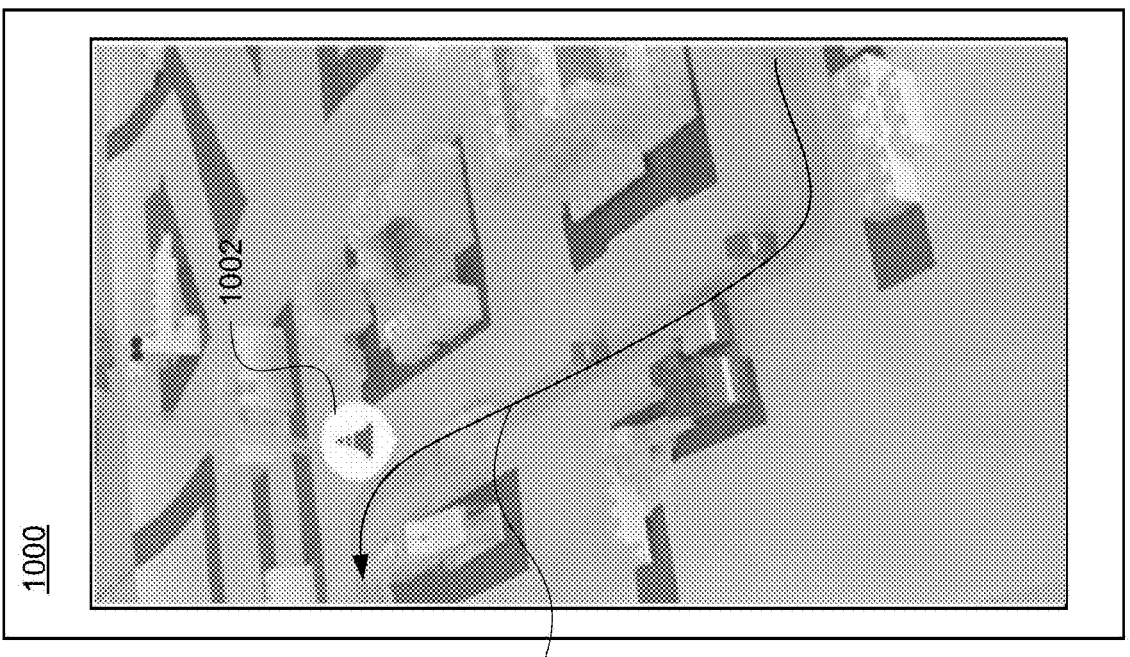

Once the rider is in the vehicle, they can use the in-vehicle display system (e.g., center console, dashboard, back of headrest or other display) to view AR enhancements. Here, the system can add icons or other imagery about objects in the vehicle's environment that may impact the trip, in order to provide helpful context to the rider(s) about what is currently happening and/or why certain driving decisions are made. For instance, as shown in example 1000 of FIG. 10A, a virtual construction icon 1002 can be placed along the roadway to show that the route 1004 is being changed to avoid construction. And as shown in example 1020 of FIG. 10B, a virtual traffic element 1022 could be shown to indicate why the vehicle 1024 is not moving. Here, the virtual traffic element could be highlighted in color to show its state: red, green or yellow. In another example, virtual road users could be added as AR enhancements. For instance, the system could present "imagined" moments with a cyclist going by the vehicle and displaying a visualization of how the vehicle's lidar sensor(s) map the lidar point cloud over the cyclist as they ride past (or show pedestrians waiting to cross at the corner of an intersection).

In another scenario, at certain locations, which may be predetermined (e.g., at selected waypoints along the vehicle's route), AR might be used to tap/enable a "tourist" moment. For instance, the rider might use a camera of their client device (or from the vehicle's perception system) to view the Ferry building or the Golden Gate Bridge in San Francisco, see an option in the UI to "select" that point of interest, and the vehicle might then launch into describing a short history or trivia (e.g., via audio, text or graphics) about the landmark, using one or more in-vehicle display devices or other parts of the vehicle's user interface system to present the information.

Figure 11B:
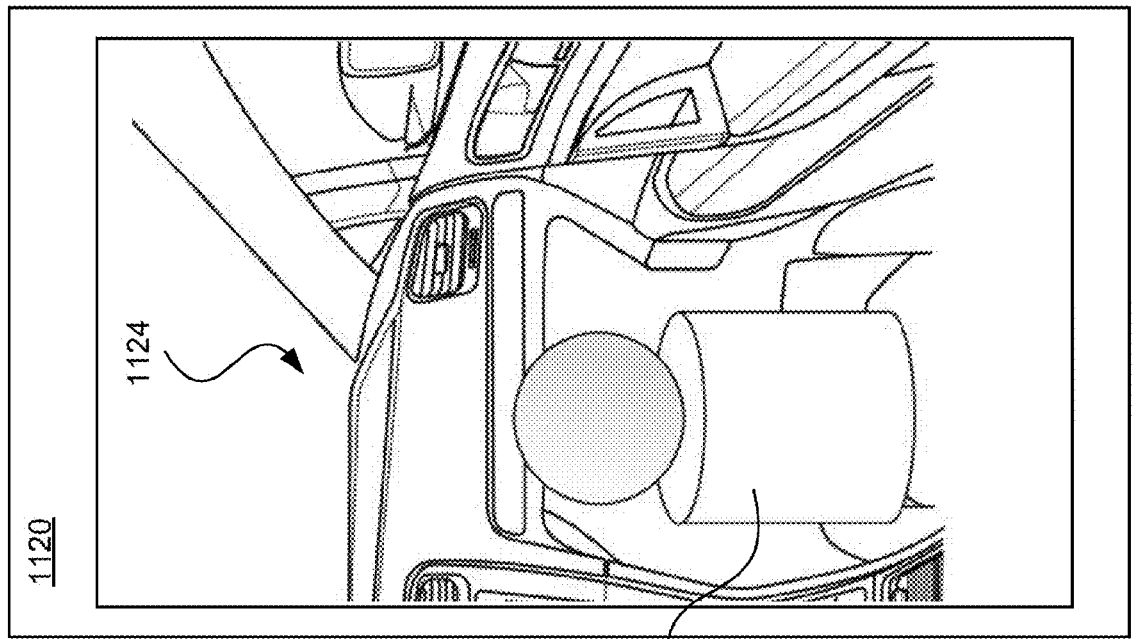
FIGS. 11A-D illustrate educational and infotainment examples in accordance with aspects of the technology.
Figure 11A:
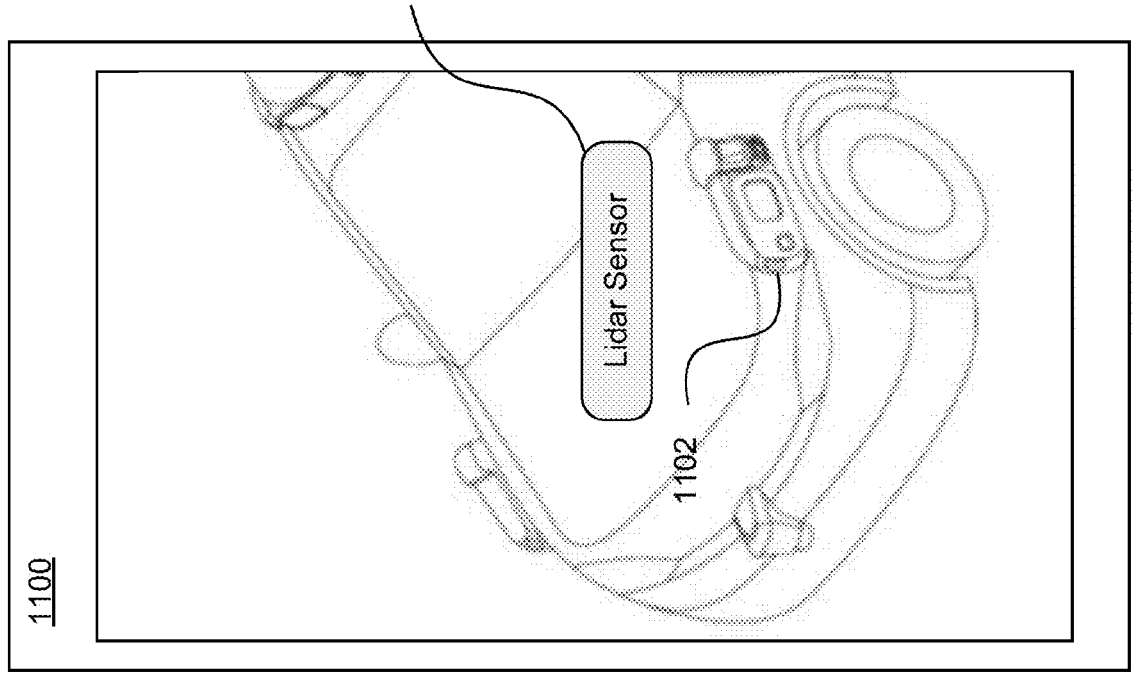
Figure 11C:
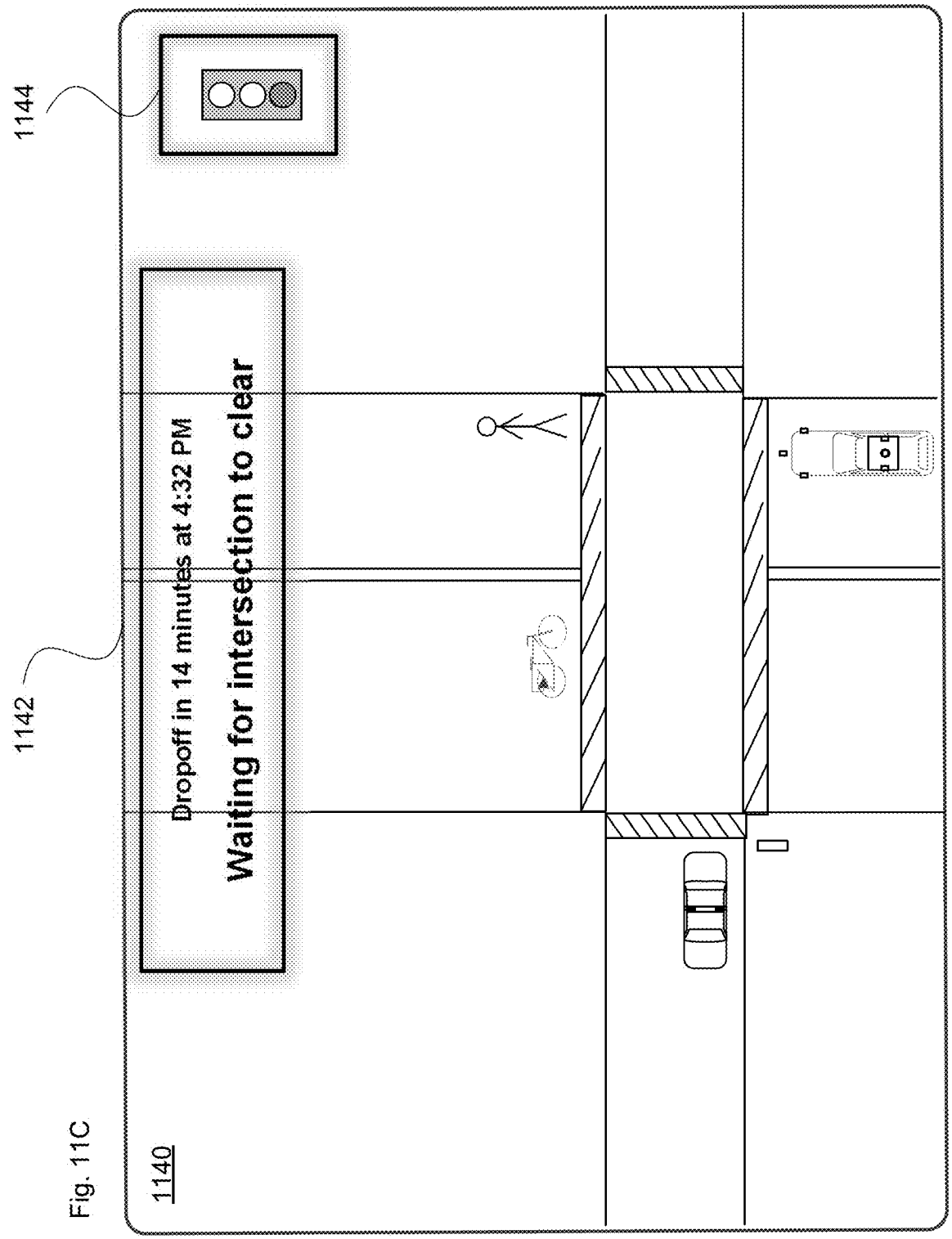
Figure 11D:
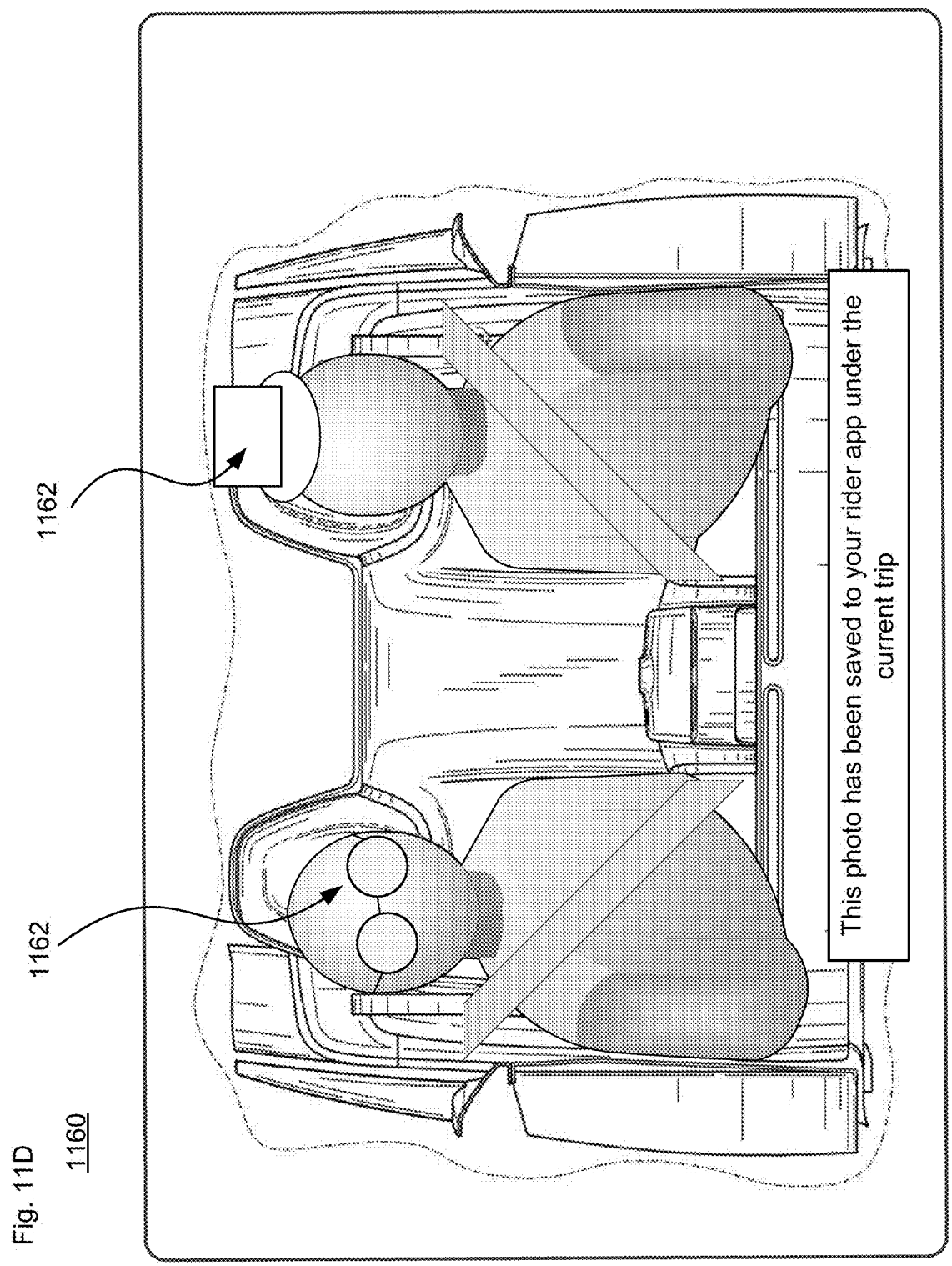

Other aspects of the technology that can be implemented when the rider is in the vehicle include educational features and infotainment. For instance, in example 1100 of FIG. 11A, the passenger could take a virtual tour of the vehicle (inside and/or outside), in which certain features (e.g., a lidar sensor 1102) are highlighted via an overlay 1104. Or, as shown in example 1120 of FIG. 11B, an AR object 1122 is placed within the vehicle, such as on a seat in the passenger compartment 1124. In the example view of FIG. 11C, a map 1140 is shown being overlaid with AR object 1142 to provide contextual information about the trip (e.g., expected drop-off time) and the current vehicle status (e.g., "Waiting for intersection to clear"), and with AR object 1144 as a virtual stoplight that gives the status of the actual light. Here, even though the stoplight is shown as being green, the vehicle is not proceeding, which has prompted the vehicle to indicate the current vehicle status to the rider. And as shown in view 1160 of FIG. 11D, a "selfie" image taken within the vehicle (e.g., using an interior camera from the vehicle's perception system or using a camera from a client device) can have one or more AR elements 1162 added. The augmented imagery can be automatically saved and associated with the rider's trip so that they can access the imagery to share or remove it as desired.

By way of example, an AR object can be overlaid with the in-vehicle display screen to inform and educate riders what might happen with features that may be less understood or are associated with trip operations. For instance, this could be information that explains what happens when the rider presses the "pull over button", or the AR object could indicate and illustrate what actions the vehicle might take. An AR object associated with rider support can explain what happens when the rider calls rider support during a trip. Other items the AR objects might highlight include safety features, such as showing where the seatbelts are located, and which lap belt couples to which locking mechanism, as well as instructions regarding booster and child seats. Or, alternatively or additionally, the AR object may indicate where printed information (e.g., a safety welcome card) is kept in the back of the front seat pocket.

According to one aspect of the technology, the system may transition AR wayfinding information from an in-vehicle display to a client device display (or vice-versa). For instance, prior to exiting the vehicle there may be AR enhanced walking directions shown on the vehicle's center console. But once the rider is ready to exit the vehicle, it can be very helpful to seamlessly continue presenting updated walking directions as if the UI goes with the rider. This, before the rider leaves, the in-vehicle screen (and possibly a voiceover) can announce that the rider can continue using AR with their device. Here, the rider can tap a button on the in-car screen to "continue" in-app, which will bring up AR view right when they open the app from their device. Alternatively, the system may simply open to a screen in the app on the client device with a "AR" affordance without requiring the rider to select anything in the in-vehicle screen.

Another power aspect of the technology is leveraging how the type of device, either the client device or the in-vehicle device, can impact how AR-related information is presented. For instance, a rider or other use may have a smart watch, a mobile phone, and/or a head-mounted display as different user devices, while the vehicle may have displays of different aspect ratios and placements in the center console, dashboard, seat headrests, etc. Here, screen size, position/orientation relative to the user, how they hold it or are able to view it, etc., may all impact what the UI looks like-in particular what information is presented and how it appears to the user. The vehicle, client device or back-end computing device(s) may select different AR or other elements depending on the display device type.

Alternatively or additionally, spatial audio can be utilized to provide information to the rider or other user. Here, spatial audio includes using dynamic head tracking to hear audio coming from a certain direction (e.g., the user hears a car honking coming from their right side and as they move their head to the right, the audio adjusts accordingly). For instance, instead of honking the vehicle's horn, this could be done only in a user's headphones. This would reduce ambient noise in the vehicle's driving environment while helping to direct the user to the vehicle based on the audio spatial mapping, such as part of a private audio wayfinding experience.

As noted above, haptics could also be employed in wayfinding to help signal to a user if they are on or off course. For example, a series of quick haptic patterns (e.g., a 0.25-2.0 second pattern) could signal that the user is getting "warmer" while slower haptics (e.g., a 2.0-5.0 second pattern) could signal that the user is off course (or vice versa). Haptics can also be used to course correct the user with regard to their current heading. When the user is pointing toward the destination, the system can use a haptic "bump" to indicate that they are following the right path. Users can quickly confirm the validity of their heading by slightly adjusting their heading and waiting for haptic feedback, without needing to look at their device. Thus, combined with AR, using various patterns of haptics may be used to indicate initiation of wayfinding in AR mode, while various patterns or codes of patterns may be used to help verify heading that matches graphics that are show in AR. Haptics may be distributed between devices, so the user may be following the map on their mobile phone, but haptic signals on their smart watch can work in concert with what's displayed on the mobile phone, such as to signal that a turn is up a head. Haptics can also be used to indicate the person's arrival at the pickup location or completion in sighting the car in AR, where the AR graphics combined with the haptic may signal successful arrival and location (spotting) of the vehicle.

According to another aspect, when the user is inside of the vehicle, various sensor and UI features can be combined to enhance the in-vehicle experience. For instance, when the camera is "up" based on how the camera scans the interior vehicle environment, when an object is detected in the camera's field of view, a haptic 'overlay' can trigger. In this case, if the vehicle includes specific physical buttons or button pods in the seating area (e.g., user inputs 214 of FIG. 2), a user can 'scan' the in-vehicle environment in the AR mode. For sighted people, graphic overlaying indicators can be presented on the in-vehicle display devices and/or the user's device to show where the buttons/button pod can be found. For sight-impaired or low vision users—the haptic sensation (e.g., via their user device or haptic patterns emitted from their seat) plus voice from the vehicle can indicate a 'hot spot' and even direct the user how to further locate the button. By way of example, after the user has entered car, they can 'scan' the vehicle's cabin and when their phone or other device identifies a 'button pod' having one or more user input buttons, a haptic signal is issued. In this case, if the vehicle is aware of the user scanning with their device, the vehicle can give audio information through the vehicle's interior speakers (e.g., 218 in FIG. 2), such as by stating "You've found the button pod-if you reach forward, you will be able to feel the button pod console". Another option is to scan the environment using haptic feedback to give the rider the "lay of the land". Akin to outlining the exterior of a building; a "haptic path" that traces and maps the interior layout of the vehicle's cabin configuration may be also another option. Furthermore, if the user's belongings dropped and moved around in the vehicle (e.g., a package or other object fell on the floor and rolled under the front seat), AR may (both visual, haptic, and audible) be utilized to help the rider find the object by providing visual (as well as haptic and/or audible) cues.

After the vehicle arrives at the pickup, by accurately identifying which vehicle in the AR image is the one assigned to the user, the system can supplement the image with an indicator to convey that information to the user. For example, the system can render an arrow or other AR element above the vehicle, which points to the vehicle. This could be especially useful in a scenario where multiple autonomous vehicles from the fleet are in sight at the pickup location.

Example AR Wayfinding System Architecture

Figure 12A:
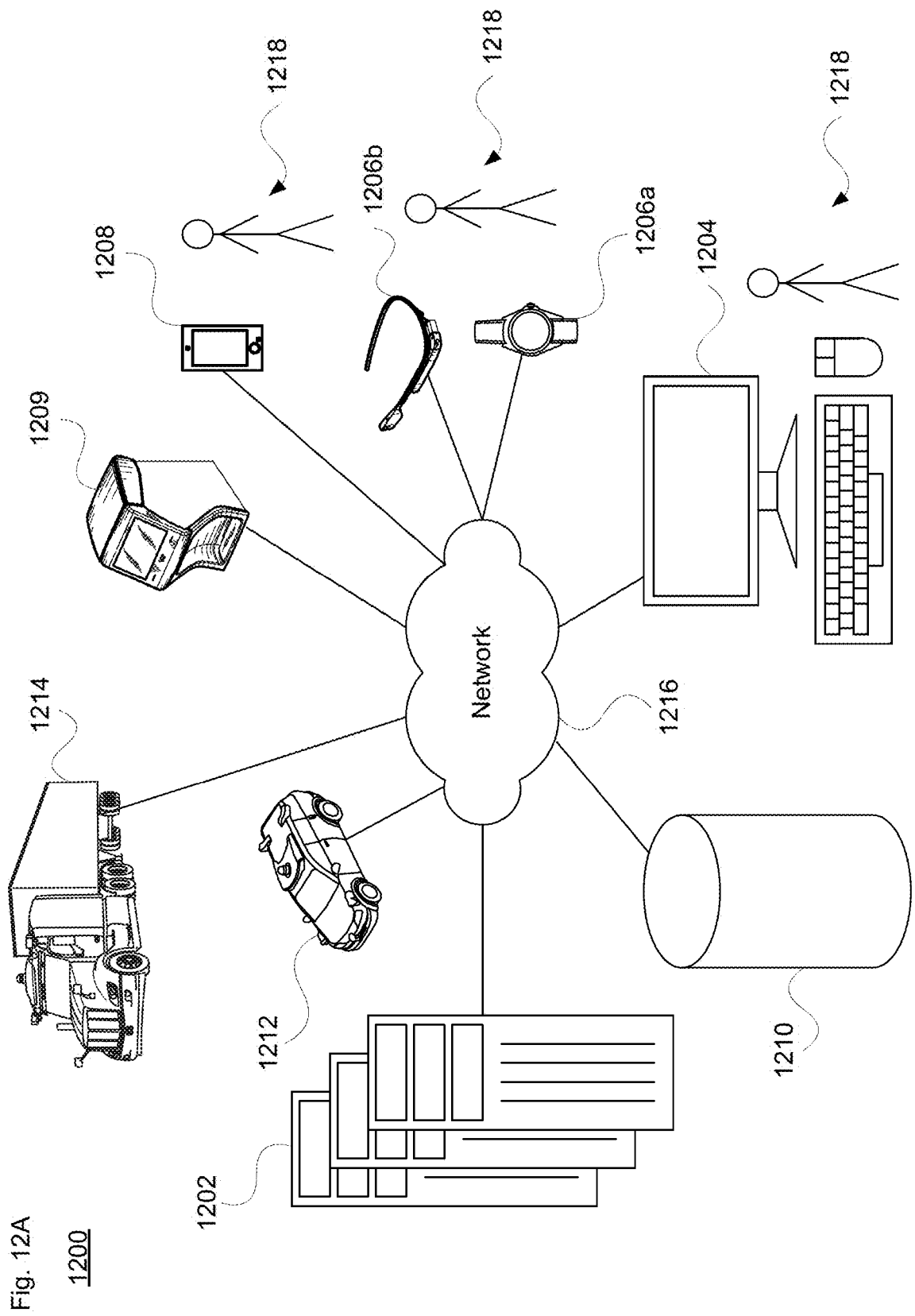
FIGS. 12A-B illustrate an example system in accordance with aspects of the technology.
Figure 12B:
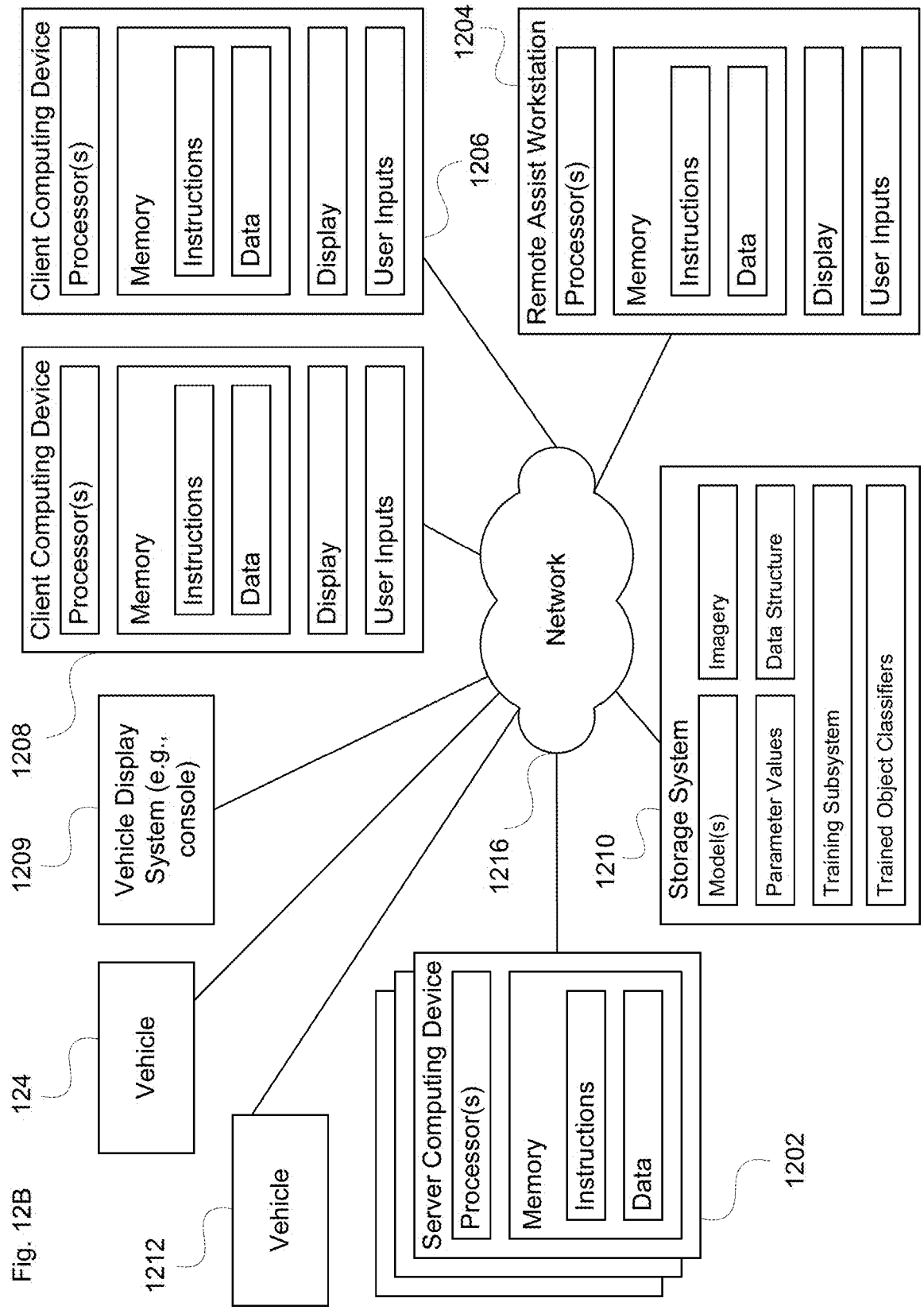

One example of a back-end system that can support AR wayfinding for fleet-type operation is shown in FIGS. 12A and 12B. In particular, FIGS. 12A and 12B are pictorial and functional diagrams, respectively, of an example system 1200 that includes a plurality of computing devices 1202, 1204, 1206, 1208, 1209 and a storage system 1210 connected via a network 1216. System 1200 also includes vehicles 1212 and 1214 configured to operate in an autonomous driving mode, which may be configured the same as or similarly to vehicles 100, 120, 140 and/or 160 of FIGS. 1A-E. Vehicles 1212 and/or vehicles 1214 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles.

As shown in FIG. 12B, each of computing devices 1202, 1204, 1206, 1208 and 1209 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 1216. The network 1216 and any intervening nodes may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1202 may include one or more server computing devices having a plurality of computing devices, e.g., a load balanced server farm, that exchange information with different nodes of a network for the purpose of receiving, processing and transmitting the data to and from other computing devices. For instance, computing device 1202 may include one or more server computing devices that are capable of communicating with the computing devices of vehicles 1212 and/or 1214, as well as computing devices 1204, 1206, 1208 and 1209 via the network 1216. For example, vehicles 1212 and/or 1214 may be a part of a fleet of autonomous vehicles that can be dispatched by a server computing device to various locations. In this regard, the computing device 1202 may function as a dispatching server computing system which can be used to dispatch vehicles to different locations in order to pick up and drop off passengers or to pick up and deliver cargo or other items. In addition, server computing device 1202 may use network 1216 to transmit and present information to a user of one of the other computing devices or a rider in a vehicle. In this regard, computing devices 1204, 1206 and 1208 may be considered client computing devices, and computing device 1209 such as a center console display may be considered a vehicle-based computing device.

As shown in FIGS. 12A-B each client computing device 1204, 1206 and 1208 may be a personal computing device intended for use by a respective user 1218, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch or head mounted display that is operable to display information), and user input devices (e.g., a mouse, keyboard, touchscreen, microphone or gesture sensor such as a close range RF gesture detection device). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1206 and 1208 may be mobile phones or devices such as a wireless-enabled PDA, a tablet PC, a wearable computing device (e.g., a smartwatch or head mounted display), or a netbook that is capable of obtaining information via the Internet or other networks.

In some examples, client computing device 1204 may be a remote assistance workstation used by an administrator or operator to communicate with riders of dispatched vehicles, customers awaiting deliveries or store employees providing items for delivery. Although only a single remote assistance workstation 1204 is shown in FIGS. 12A-B, any number of such workstations may be included in a given system. Moreover, although the workstation is depicted as a desktop-type computer, such workstations may include various types of personal computing devices such as laptops, netbooks, tablet computers, etc. By way of example, the remote assistance workstation may be used by a technician or other user to help adjust pickup or drop-off locations, assist riders with opening or closing the vehicle's doors, etc.

Storage system 1210 can be of any type of computerized storage capable of storing information accessible by the server computing devices 1202, such as a hard-drive, memory card, ROM, RAM, DVD, CD-ROM, flash drive and/or tape drive. In addition, storage system 1210 may include a distributed storage system where data is stored on a plurality of different storage devices which may be physically located at the same or different geographic locations. Storage system 1210 may be connected to the computing devices via the network 1216 as shown in FIGS. 12A-B, and/or may be directly connected to or incorporated into any of the computing devices.

Storage system 1210 may store various types of information. For instance, the storage system 1210 may store autonomous vehicle control software which is to be used by vehicles, such as vehicles 1212 or 1214, to operate such vehicles in an autonomous driving mode. Storage system 1210 may also store information used to support AR wayfinding features, such as different types of AR icons or other elements that can be shared with vehicles or rider client devices. The storage system 1210 may also store customer preferences for selected AR features as noted above. The storage system 1210 can also include route information, weather information, etc. This information may be shared with the vehicles 1212 and 1214, for instance to help with operating the vehicles in an autonomous driving mode. Such information can also be shared with customers via the UI or other app on their client device(s).

FIG. 13 illustrates a flow diagram 1300 according to one aspect of the technology, which provides a method that includes, at block 1302, generating, for presentation in a first region of a user interface of a client device, trip information regarding a trip by a vehicle operating in an autonomous driving mode. At block 1304 the method includes generating, for presentation in a second region of the user interface separate from the first region, map information associated with the trip. The map information includes at least one of a pickup location for a rider, a walking path from a current location of the rider to the pickup location, a planned route of the vehicle to the pickup location, or a current location of the vehicle. At block 1306 the method includes generating an augmented reality live view indicator for presentation in the second region of the user interface. At block 1308, the method includes, in response to selection of the augmented reality live view indicator, either: (i) modifying the second region into a first section to display at least a portion of the map information and a second section to display an augmented reality view, or (ii) replacing the map information with the augmented reality view. The augmented reality view presents imagery of the pickup location overlaid with at least one augmented reality element to guide the rider to the pickup location. And at block 1310 the method includes updating the at least one augmented reality element as the rider approaches the pickup location.

While certain use cases described above focus on rider pickup situations in the ride hailing context, the technology may be used in many other situations. As noted earlier, this can include delivery situations, where the person going to the vehicle may be a restaurant or store employee loading the vehicle with a meal, groceries, prescription or other package. Similarly, in a trucking scenario, the person or people heading to the vehicle could be warehouse workers that will load or unload the truck with cargo, or that need to transfer cargo to or from the truck (e.g., a mail delivery truck). All of these situations can benefit from the AR wayfinding features described above.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method, comprising:
  generating, by one or more processors for presentation in a region of a user interface of a client device, map information associated with a trip by a vehicle operating in an autonomous driving mode;
  generating, by the one or more processors, an augmented reality live view indicator for presentation in the region of the user interface;
  in response to selection of the augmented reality live view indicator, the one or more processors either: (i) modifying the region into a first section to display at least a portion of the map information and a second section to display an augmented reality view, the augmented reality view presenting imagery of a pickup location for a rider overlaid with at least one augmented reality element to guide the rider to the pickup location or (ii) replacing the map information with the augmented reality view, the augmented reality view presenting the imagery of the pickup location overlaid with the at least one augmented reality element to guide the rider to the pickup location;
  updating, by the one or more processors, the at least one augmented reality element as the rider approaches the pickup location; and
  upon dynamic adjustment to the pickup location by the vehicle based on imagery obtained in real time by the client device, modifying the augmented reality view in the user interface to indicate an adjusted pickup location.

2. The method of claim 1, wherein replacing the map information with the augmented reality view includes minimizing the map information within the region.

3. The method of claim 1, further comprising generating, by the one or more processors for presentation in a further region of the user interface, trip information regarding the trip by the vehicle.

4. The method of claim 1, wherein:
  the augmented reality view provides at least one vehicle control option for selection by the rider; and
  upon selection of a given one of the at least one vehicle control option, sending a signal to the vehicle to cause the vehicle to perform an action.

5. The method of claim 4, wherein the action is to generate a visual or audible signal to the rider.

6. The method of claim 4, wherein the action is to either unlock a door of the vehicle or to roll down a window of the vehicle.

7. The method of claim 1, wherein the augmented reality view includes an augmented reality representation of the vehicle at the pickup location.

8. The method of claim 7, further comprising:
determining, by the one or more processors, at least one of an appropriate size, orientation or placement of the augmented reality representation of the vehicle; and
arranging for display, based on the determining, the augmented reality representation of the vehicle at the pickup location.

9. The method of claim 8, wherein determining the orientation or placement includes selecting an alignment of the augmented reality representation relative to a curb of a roadway in the imagery of the pickup location.

10. The method of claim 7, further comprising adjusting the augmented reality representation of the vehicle when the rider's location changes or the pickup location changes.

11. The method of claim 1, wherein:
the at least one augmented reality element includes a first augmented reality element representing the vehicle and a second augmented reality element that is a marker to identify either a pickup spot or a landmark; and
updating the at least one augmented reality element includes updating the first augmented reality element but not the second augmented reality element.

12. The method of claim 1, further comprising sending the imagery from the client device to the vehicle to support the dynamic adjustment to the pickup location.

13. The method of claim 1, wherein the imagery of the pickup location is obtained from a perception system of the vehicle.

14. The method of claim 1, further comprising customizing the at least one augmented reality element in response to a rider selection or user preference.

15. The method of claim 1, wherein:
the at least one augmented reality element includes an icon representing the pickup location; and
the method further comprises requesting a change to the pickup location in response to receiving rider input modifying a position of the icon.

16. The method of claim 1, further comprising generating information for presentation to the rider regarding a sensor of the vehicle, the information including at least one of a description of the sensor or what the sensor is configured to detect.

17. The method of claim 1, further comprising, upon rider arrival at the pickup location, generating boarding instructions to the rider for entering the vehicle.

18. The method of claim 1, further comprising, upon rider arrival at the pickup location, generating indicia to show the rider the location of a package being delivered by the vehicle.

19. The method of claim 1, wherein upon the rider boarding the vehicle, generating an augmented reality object for presentation in the user interface of the client device, the augmented reality object providing contextual information about the trip.

20. The method of claim 1, wherein upon the rider boarding the vehicle, causing information displayed in the user interface of the client device to be sent to the vehicle for presentation on one or more display devices of the vehicle during the trip.

21. The method of claim 3, wherein the trip information includes an indicia about the vehicle.

22. The method of claim 1, wherein the dynamic adjustment to the pickup location by the vehicle is based on an unknown in the imagery obtained in real time by the client device.

* * * * *